US012609261B2

(12) United States Patent
Yoneda

(10) Patent No.: US 12,609,261 B2
(45) Date of Patent: Apr. 21, 2026

(54) PROTECTIVE ELEMENT

(71) Applicant: DEXERIALS CORPORATION, Shimotsuke (JP)

(72) Inventor: Yoshihiro Yoneda, Shimotsuke (JP)

(73) Assignee: Dexerials Corporation, Tochigi (JP)

( * ) Notice: Subject to any disclaimer, the term of this patent is extended or adjusted under 35 U.S.C. 154(b) by 18 days.

(21) Appl. No.: 18/033,848

(22) PCT Filed: Nov. 15, 2021

(86) PCT No.: PCT/JP2021/041915
§ 371 (c)(1),
(2) Date: Apr. 26, 2023

(87) PCT Pub. No.: WO2022/113804
PCT Pub. Date: Jun. 2, 2022

(65) Prior Publication Data

US 2023/0411099 A1 Dec. 21, 2023

(30) Foreign Application Priority Data

Nov. 27, 2020 (JP) ................................ 2020-197198

(51) Int. Cl.
*H01H 85/10* (2006.01)
*H01H 85/17* (2006.01)
*H01H 85/38* (2006.01)

(52) U.S. Cl.
CPC ............ *H01H 85/10* (2013.01); *H01H 85/17* (2013.01); *H01H 85/38* (2013.01)

(58) Field of Classification Search
CPC ........ H01H 85/10; H01H 85/17; H01H 85/38; H01H 85/153; H01H 85/06; H01H 85/00; H01H 85/175

(Continued)

(56) References Cited

U.S. PATENT DOCUMENTS 4,263,574 A * 4/1981 Mori ...................... H01H 85/47 337/164
8,547,195 B2 * 10/2013 Kimura ............ H01M 10/4235 337/267

(Continued)

FOREIGN PATENT DOCUMENTS

JP H04-114718 U 10/1992
JP H11-343385 A 12/1999

(Continued)

OTHER PUBLICATIONS

Office Action issued May 7, 2024 in corresponding Japanese Patent Application No. 2020-197198 (with English translation), 10 pages.
Written Opinion issued Jan. 11, 2022 in PCT/JP2021/041915 (with English translation), 10 pages.
Office Action issued Jul. 30, 2024 in corresponding Korean Patent Application No. 10-2023-7007215 (with English translation), 13 pages.

(Continued)

*Primary Examiner* — Sreeya Sreevatsa
(74) *Attorney, Agent, or Firm* — Element 1P, PLC

(57) ABSTRACT

A protective element includes: a fuse element which includes a blowout portion between a first end portion and a second end portion, and is energized in a first direction; and a case having a housing portion housing the blowout portion therein. A length in a thickness direction in a cross section perpendicular to the first direction of the blowout portion is less than or equal to a length in a width direction perpendicular to the thickness direction in the cross section. A first wall surface and a second wall surface that face each other in the thickness direction are provided in the housing portion. A distance in the thickness direction between the first wall surface and the second wall surface is 10 times or less the length in the thickness direction of the blowout portion.

15 Claims, 14 Drawing Sheets

(58) Field of Classification Search
USPC .......................................................... 361/104
See application file for complete search history.

(56) References Cited

U.S. PATENT DOCUMENTS

| | | | | |
|---|---|---|---|---|
| 10,553,387 | B1 | 2/2020 | Angelini | |
| 2005/0264394 | A1* | 12/2005 | Furuuchi ................ | H01H 37/76 337/182 |
| 2020/0006030 | A1* | 1/2020 | Yoneda .................. | H01H 85/06 |
| 2022/0200111 | A1 | 6/2022 | Kimura et al. | |

FOREIGN PATENT DOCUMENTS

| | | | | |
|---|---|---|---|---|
| JP | 2004185960 | A | | 7/2004 |
| JP | 2004265618 | A | | 9/2004 |
| JP | 2007035280 | A | * | 2/2007 |
| JP | 2013175389 | A | | 9/2013 |
| JP | 2016071972 | A | | 5/2016 |
| JP | 2017004634 | A | | 1/2017 |
| JP | 2017010896 | A | | 1/2017 |
| JP | 2018166099 | A | | 10/2018 |
| WO | WO-2020209071 | A1 | | 10/2020 |

OTHER PUBLICATIONS

International Search Report issued Jan. 11, 2022 in PCT/JP2021/041915 (with English translation), 6 pages.

Office Action issued Nov. 5, 2025, in corresponding Japanese Patent Application No. 2020-197198 (with English translation), 8 pages.

Combined Taiwanese Office Action and Search Report issued Apr. 15, 2025, in corresponding Taiwanese Patent Application No. 110144240 (with machine English translation), 15 pages.

Office Action issued Apr. 29, 2025, in corresponding Korean Patent Application No. 10-2023-7007215 (with machine English translation), 10 pages.

Indian Office Action issued Jun. 20, 2025 in Patent Appheation No. 202317031266, 6 pages.

Office Action issued Nov. 17, 2025, received Nov. 18, 2025, in corresponding Indian Patent Application No. 202317031266, 2 pages.

Office Action issued Feb. 3, 2026, in corresponding Japanese Patent Application No. 2025-013062 (with machine English translation), 8 pages.

* cited by examiner

| | Example 1 | Example 2 | Example 3 |
|---|---|---|---|
| Space Height | 0.75mm | 0.25mm | 1.75mm |
| Cutoff Time | 14.3ms | 5.9ms | 15.5ms |
| Fusing Length | 12.1mm | 8mm | 13.4mm |
| X-Ray Top Surface Before Test |  |  |  |
| X-Ray Side Surface Before Test |  |  |  |
| At the Time of Cutoff |  |  |  |
| X-Ray Top Surface After Test |  |  |  |
| Judgment | B | A | B |

| | Example 4 | Example 5 | Comparative Example 1 |
|---|---|---|---|
| Space Height | 1.5mm | 2.0mm | 4.0mm |
| Cutoff Time | 22.0ms | 43.0ms | 33.3ms |
| Fusing Length | | | |
| X-Ray Top Surface Before Test |  |  |  |
| X-Ray Side Surface Before Test |  |  |  |
| At the Time of Cutoff |  | | |
| X-Ray Top Surface After Test |  |  |  |
| Judgment | C | C | D |

PROTECTIVE ELEMENT

TECHNICAL FIELD

The present invention relates to a protective element.

The present application claims priority based on JP 2020-197198 filed in Japan on Nov. 27, 2020, and the contents thereof are hereby incorporated by reference.

BACKGROUND TECHNOLOGY

Conventionally, there is a fuse element that, when a current exceeding a rated value flows in a current path, generates heat and fuses, thereby cutting the current path off. A protective element (fuse element) provided with a fuse element is used in a wide range of fields such as, for example, an electric automobile.

For example, a fuse element used mainly in an electric circuit for an automobile and the like is disclosed in Patent Document 1. Patent Document 1 discloses a fuse element provided with two elements coupled between terminal portions positioned at both end portions, and a fusion portion provided substantially in the center of the element. Patent Document 1 discloses a fuse in which two fuse elements are stored in a casing and an arc extinguishing material is sealed between the fuse elements and the casing.

CITATION LIST

Patent Documents

Patent Document 1: JP 2017-004634 A

SUMMARY OF THE INVENTION

Problem to be Solved by the Invention

As relating to protective elements installed in current paths with high voltage and high current, arc discharge readily occurs when the fuse element fuses. Large-scale arc discharge may destroy the case in which the fuse element is housed. Because of this, in conventional art, the greater the voltage and current of the current path in which the protective element is installed, the larger the case housing the fuse element is in the protective element.

However, as the size of the case for housing the fuse element increases, more material must be used in the case. Furthermore, size and weight reduction are required for the protective element.

In light of the above circumstances, an object of the present invention is to provide a size-reducible protective element in which the arc discharge that occurs when the fuse element fuses is small in scale.

Means for Solving the Problem

In order to obtain a small-sized protective element in which arc discharge which occurs when a fuse element fuses is small in scale, the present inventors focused on the size of a housing portion in a case in which a blowout portion of the fuse element is housed and have made extensive studies as shown below.

That is, as will be described later, a fuse element with a thickness of 0.2 mm and a width of 6.5 mm was installed in a housing portion of a case, a protective element A where the distance in the thickness direction of the fuse element in the housing portion is made to be 0.75 mm was manufactured and installed in a current path with a voltage of 150 V and a current of 190 A, and the current was cut off.

Also, a protective element B provided with the same fuse element as the protective element A and having a distance of 14 mm in the thickness direction of the fuse element in the housing portion of the case is manufactured and installed in a current path with a voltage of 150 V and a current of 190 A, and the current was cut off.

As a result, large-scale arc discharge occurred in the protective element B. Conversely, for the protective element of the protective element A, the arc discharge was very small in scale compared to that in the protective element B. This is presumed to be due to the reasons given below.

FIG. 15 is a drawing for describing a line of electric force density of a blowout portion of the fuse element in the protective element A. FIG. 16 is a drawing for describing a line of electric force density of a blowout portion of the fuse element in the protective element B.

In FIGS. 15 and 16, reference number 2 indicates a fuse element, reference number 61 indicates a first terminal, and reference number 62 indicates a second terminal. Reference number 6 indicates a case. Reference number 4 indicates lines of electric force. The lines of electric force are lines that indicate /ϵ “strands” exiting a charge of Q “C” and Q/ϵ “strands” entering a charge of −Q “C.”

Since the protective element A and the protective element B have the same fuse element and the same voltage and current at the time of cutoff, the density of the lines of electric force generated by arc discharge is the same. Because of this, as illustrated in FIGS. 15 and 16, it is presumed that the longer the distance in the thickness direction of the fuse element in the housing portion of the case 6 is, the higher the number of lines of electric force 4, and the shorter the distance, the lower the number of lines of electric force 4. In other words, because the charges (thermoelectric elements) are the same polarity (negative) and repel each other, under the same discharge conditions, the spacing between the charges (density of lines of electric force) is the same regardless of the distance described above. Based on this, it is presumed that when the distance is long, the amount of mobile charge increases and the arc discharge increases in scale, and when the distance is short, the amount of mobile charge decreases and the arc discharge decreases in scale.

Furthermore, the present inventors focused on the relationship between the distance in the thickness direction of the blowout portion of the fuse element in the housing portion of the case and the thickness of the blowout portion based on the above knowledge, and have made extensive studies. As a result, it was confirmed that the distance in the thickness direction of the blowout portion in the housing portion of the case should be 10 times or less the thickness of the blowout portion.

Furthermore, the present inventors conducted extensive studies based on the knowledge described above and obtained the knowledge that, in a protective element where the distance in the thickness direction of the blowout portion in the housing portion of the case is made to be 10 times or less the thickness of the blowout portion, arc discharge becomes small in scale by disposing at least one of the wall surfaces in the thickness direction of the fuse element in the housing portion of the case in contact with the blowout portion.

It is presumed that this is because the number of electric lines of force generated by arc discharge decreases and the fuse element is cooled when the blowout portion in contact with the housing portion of the case is fused.

In addition, the present inventors conducted extensive studies on the relationship between arc discharge and the distance in the width direction of the fuse element in the housing portion of the case in the protective element in which the distance in the thickness direction of the blowout portion in the housing portion of the case is made to be 10 times or less the thickness of the blowout portion.

As a result, it was found that the longer the distance in the width direction of the fuse element in the housing portion of the case, the smaller the scale becomes because arc discharge is suppressed. This is presumed to be because when the distance in the thickness direction of the blowout portion in the housing portion of the case is the same and the distance in the width direction of the fuse element in the housing portion of the case is made longer, elevated pressure in the housing portion when the fuse element is fused is suppressed, and an effect of suppressing elevation of the line of electric force density generated by arc discharge can be obtained.

Based on these findings, the present inventors conceived of the present invention.

The present invention proposes the following means for solving the problem described above.

[1] A protective element including: a fuse element which has a blowout portion between a first end and a second end and is energized in a first direction from the first end to the second end; and a case composed of an insulating material and having a housing portion housing the blowout portion therein, wherein a length in a thickness direction in a cross section perpendicular to the first direction of the blowout portion is less than or equal to a length in a width direction crossing the thickness direction in the cross section perpendicular to the first direction, a first wall surface and a second wall surface that face each other in the thickness direction are provided in the housing portion, and a distance in the thickness direction between the first wall surface and the second wall surface is 10 times or less a length in the thickness direction of the blowout portion.

[2] The protective element according to [1], wherein the distance in the thickness direction between the first wall surface and the second wall surface is 5 times or less the length in the thickness direction of the blowout portion.

[3] The protective element according to [1], wherein the distance in the thickness direction between the first wall surface and the second wall surface is twice or less the length in the thickness direction of the blowout portion.

[4] The protective element according to any one of [1] to [3], wherein the blowout portion is disposed in contact with one or both of the first wall surface and the second wall surfaces.

[5] The protective element according to any one of [1] to [4], wherein a third wall surface and a fourth wall surface that face each other in the width direction are provided in the housing portion, and the distance in the width direction between the third wall surface and the fourth wall surface is 1.5 times or more the length of the fuse element in the width direction.

[6] The protective element according to [5], wherein the distance in the width direction between the third wall surface and the fourth wall surface is 2 to 5 times the length of the fuse element in the width direction.

[7] The protective element according to any one of [1] to [6], wherein the fuse element is planar or linear.

[8] The protective element according to any one of [1] to [7], wherein the first end is electrically connected to a first terminal and the second end is electrically connected to a second terminal.

[9] The protective element according to any one of [1] to [8], wherein a melting temperature of the fuse element is 600° C. or less.

[10] The protective element according to any one of [1] to [8], wherein a melting temperature of the fuse element is 400° C. or less.

[11] The protective element according to any one of [1] to [10], wherein the fuse element is composed of a laminated body in which an inner layer composed of a low melting point metal and an outer layer composed of a high melting point metal are laminated in the thickness direction.

[12] The protective element according to [11], wherein the low melting point metal is composed of Sn or a metal mainly composed Sn, and the high melting point metal is composed of Ag or Cu or a metal mainly composed of Ag or Cu.

[13] The protective element according to any one of [1] to [12], wherein the case is formed of a resin material having a tracking resistance index CTI of 400 V or more.

[14] The protective element according to any one of [1] to [12], wherein the case is formed of a resin material having a tracking resistance index CTI of 600 V or more.

[15] The protective element according to any one of [1] to [14], wherein the case is composed of any one type selected from nylon resins, fluorine resins, and polyphthalamide resins.

[16] The protective element according to [15], wherein the nylon resin is a resin not containing a benzene ring.

Effect of the Invention

In the protective element of the present invention, a housing portion of a case is provided with a first wall surface and a second wall surface that face each other in the thickness direction of a blowout portion of a fuse element, and the distance in the thickness direction between the first wall surface and the second wall surface is 10 times or less the length in the thickness direction of the blowout portion. Consequently, arc discharge that occurs when the fuse element is fused is made small in scale. Therefore, the protective element can be preferably installed in a current path having a high voltage of 100 V or higher and a large current of 100 A or higher, for example. The protective element can be reduced in size because the distance in the thickness direction between the first wall surface and the second wall surface is short. Furthermore, since the protective element of the present invention has small-scale arc discharge, the thickness between the housing portion of the case and the outer surface can be reduced, leading to size reduction.

BRIEF DESCRIPTION OF THE DRAWINGS

FIG. 4(*b*) is a plan view for describing a positional relationship between a first case, a second case, a fuse element, a first terminal, and a second terminal.

FIG. 5(*a*) is a plan view as seen from the housing portion side, FIG. 5(*b*) is a perspective view as seen from the housing portion side, and FIG. 5(*c*) is a perspective view as seen from the outer surface side.

FIG. 6(*a*) is a plan view as seen from the housing portion side, FIG. 6(*b*) is a perspective view as seen from the housing portion side, and FIG. 6(*c*) is a perspective view as seen from the outer surface side.

EMBODIMENTS OF THE INVENTION

Figure 1:
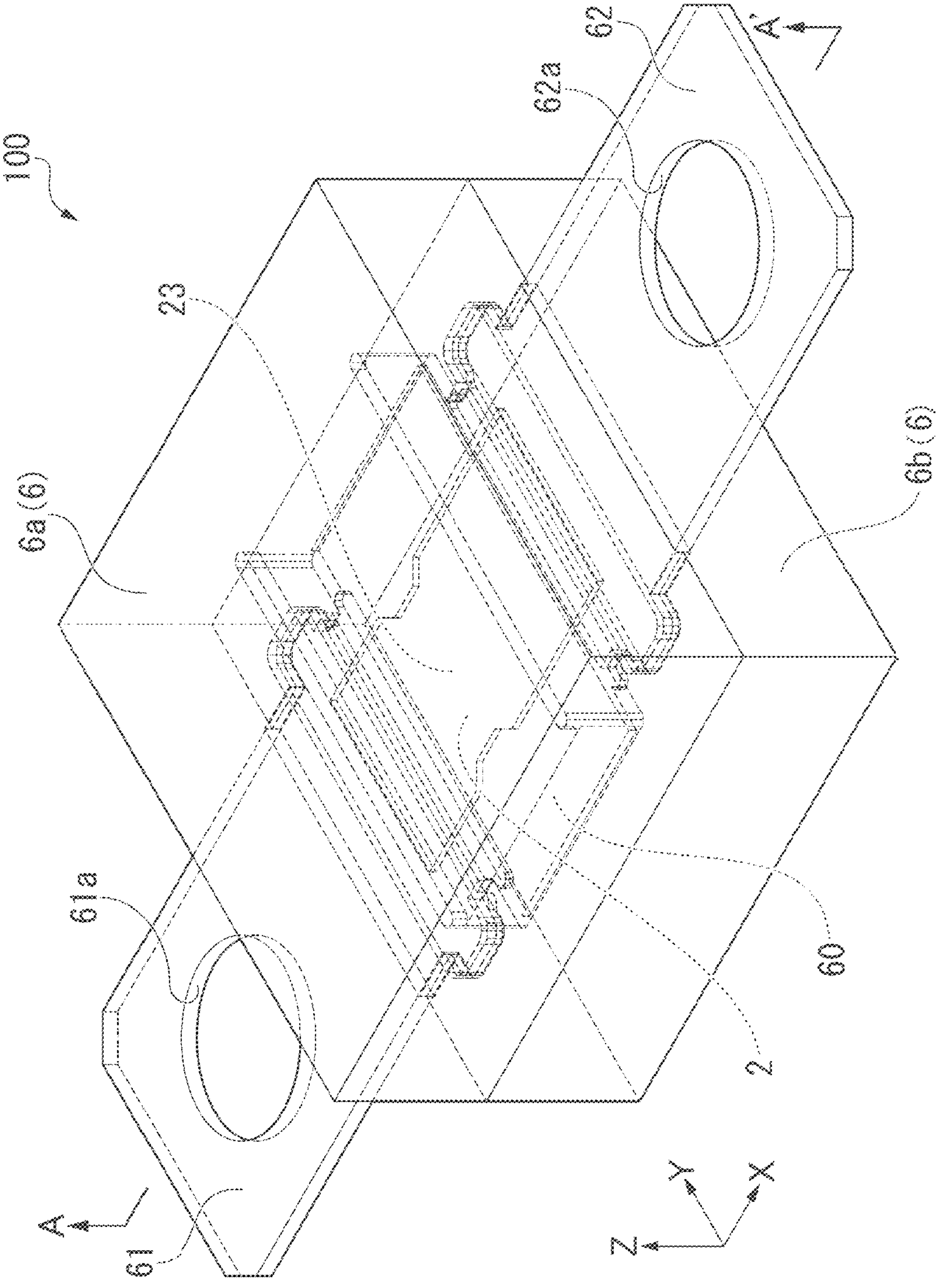
FIG. 1 is a perspective view illustrating an overall structure of a protective element 100 according to a first embodiment.

The present embodiment will be described in detail below with reference to drawings as appropriate. In the drawings used in the description below, there are cases where characteristic portions are enlarged for convenience in order to make the characteristics easy to understand, and the dimensional ratios of the components and the like may be different from reality. The materials, dimensions, and the like illustrated in the following description are one of the examples, the present invention is not limited to these, and these can be changed as appropriate within a scope demonstrating the effect of the present invention.

First Embodiment (Protective Element)

Figure 2:
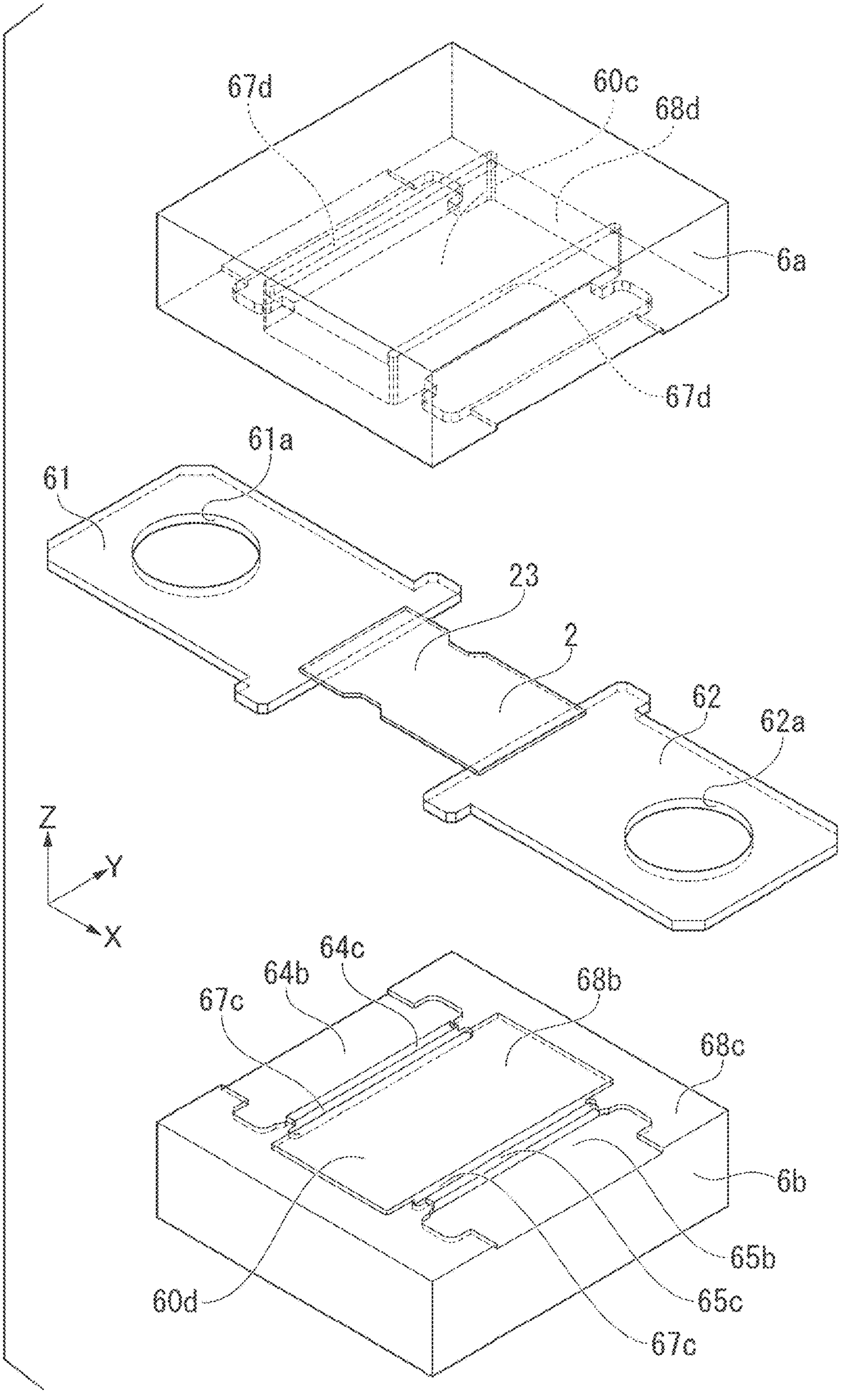
FIG. 2 is an exploded perspective view illustrating the overall structure of the protective element 100 illustrated in FIG. 1.
Figure 3:
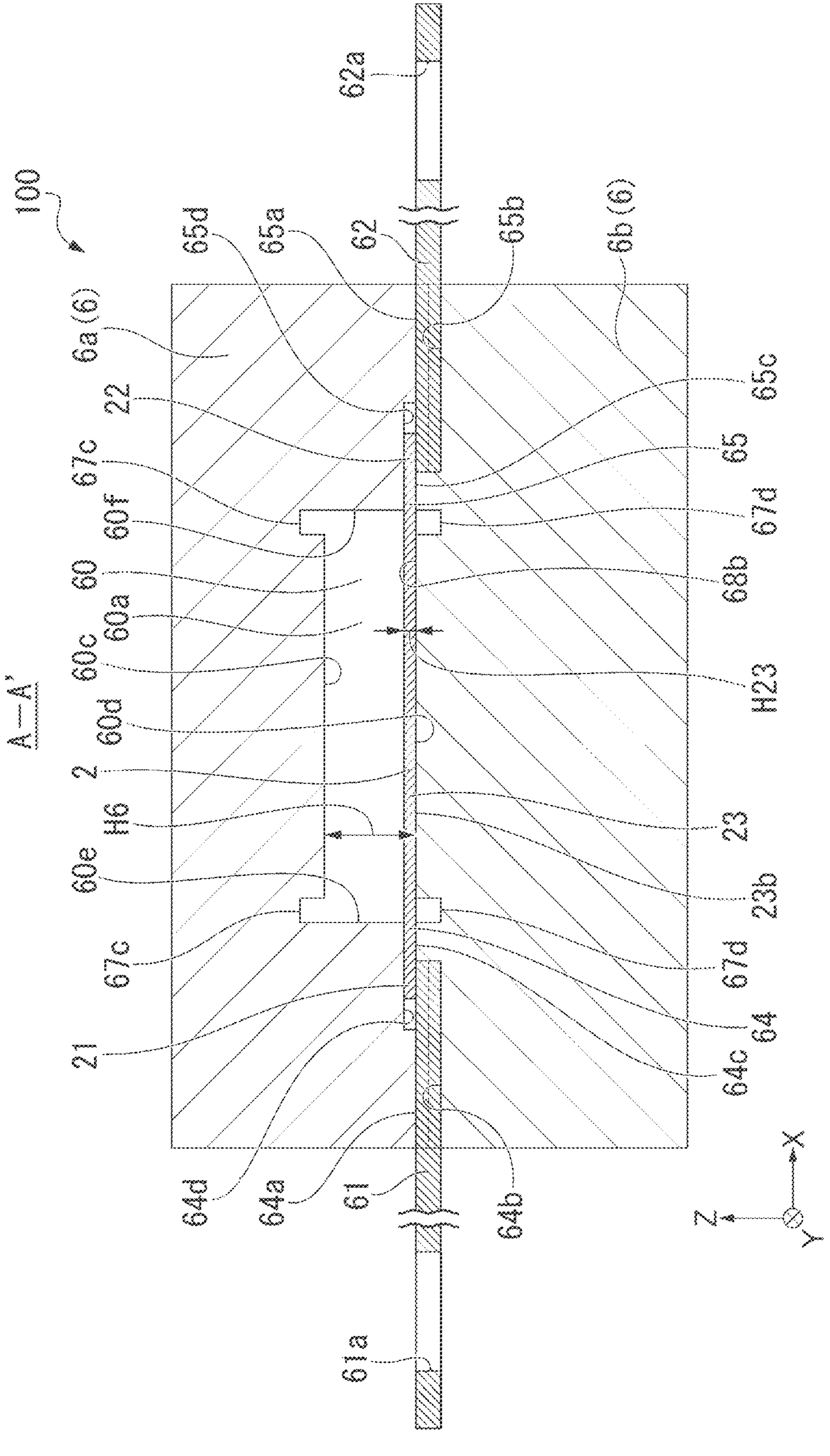
FIG. 3 is a cross-sectional view of the protective element 100 according to the first embodiment cut along the line A-A' illustrated in FIG. 1.

FIGS. 1 to 3 are schematic drawings illustrating a protective element according to the first embodiment. In the drawings used in the description below, the direction indicated by X is the current carrying direction (first direction) of the fuse element. The direction indicated by Y is a direction orthogonal to the X direction (first direction), and the direction indicated by Z is a direction orthogonal to the X direction and the Y direction.

FIG. 1 is a perspective view illustrating an overall structure of the protective element 100 according to the first embodiment. FIG. 2 is an exploded perspective view illustrating the overall structure of the protective element 100 illustrated in FIG. 1. FIG. 3 is a cross-sectional view where the protective element 100 according to the first embodiment is cut along the line A-A' illustrated in FIG. 1.

As illustrated in FIGS. 1 to 3, the protective element 100 of the present embodiment is provided with a fuse element 2 and a case 6 in which a housing portion 60 that houses a blowout portion 23 of the fuse element 2 is provided.

(Fuse Element)

Figure 4:
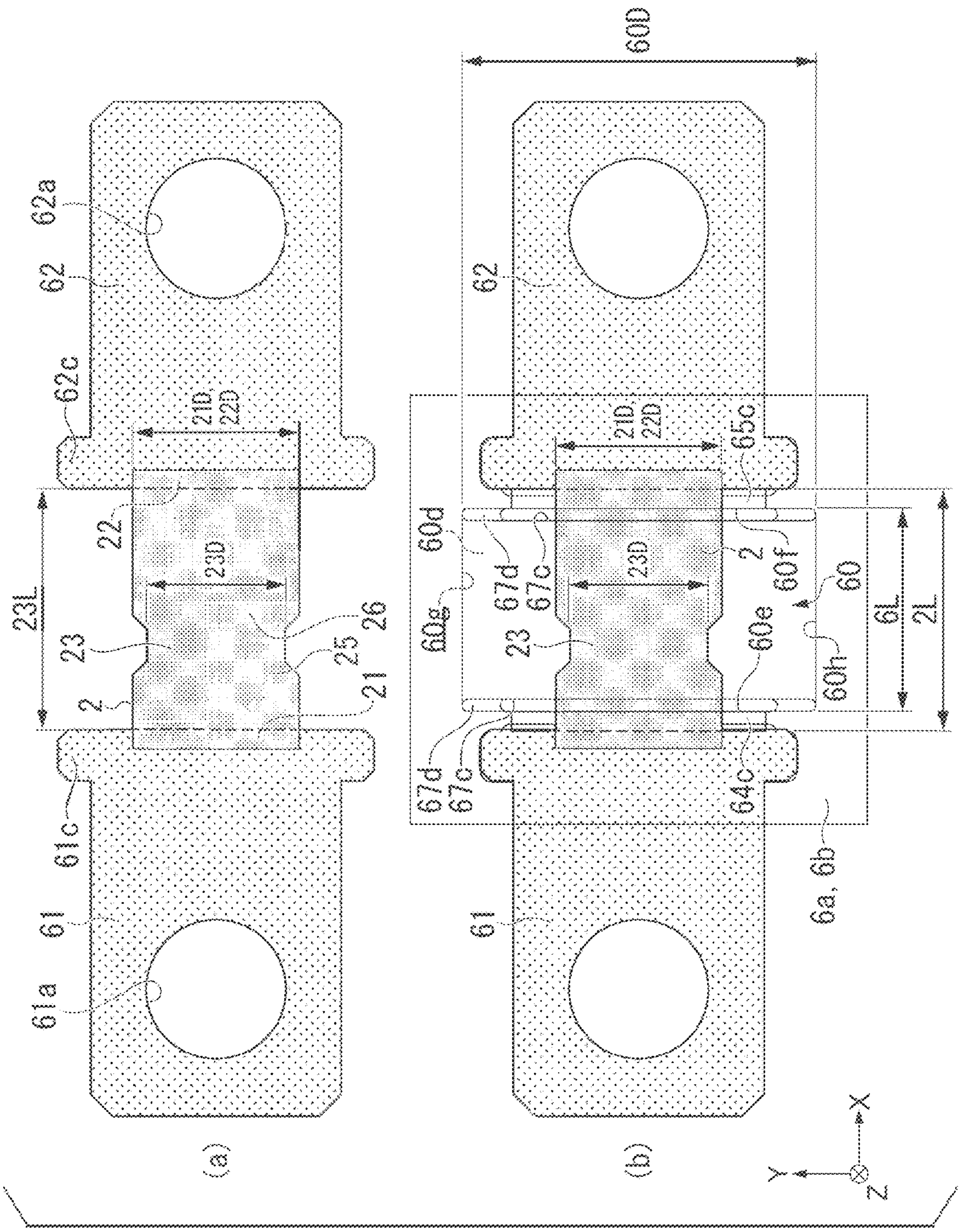
FIG. 4(*a*) is an enlarged view for describing a portion of the protective element 100 of the first embodiment and is a plan view illustrating the fuse element, the first terminal, and the second terminal.

FIG. 4(*a*) is an enlarged view for describing a portion of the protective element 100 of the first embodiment and is a plan view illustrating the fuse element 2, the first terminal 61, and the second terminal 62. FIG. 4(*b*) is a plan view for describing the positional relationship between the first case 6*a*, the second case 6*b*, the fuse element 2, the first terminal 61, and the second terminal 62.

As illustrated in FIG. 4(*a*), the fuse element 2 is in a plate shape and has a first end portion 21, a second end portion 22, and a blowout portion 23 provided between the first end portion 21 and the second end portion 22. The fuse element 2 is energized in an X direction (first direction) which is a direction from the first end portion 21 toward the second end portion 22.

As illustrated in FIGS. 3 and 4(*a*), the first end portion 21 is electrically connected to the first terminal 61. The second end portion 22 is electrically connected to the second terminal 62.

As illustrated in FIGS. 1 to 3 and 4(*a*), the first terminal 61 and the second terminal 62 may be substantially the same shape, or may have different shapes. The thickness of the first terminal 61 and the second terminal 62 are not particularly limited, but as a guide, may be 0.3 to 1.0 mm. As illustrated in FIG. 3, the thickness of the first terminal 61 and the thickness of the second terminal 62 may be the same, or may be different.

As illustrated in FIGS. 1 to 4(*a*), the first terminal 61 is provided with an external terminal hole 61*a*. Moreover, the second terminal 62 is provided with an external terminal hole 62*a*. One among the external terminal hole 61*a* and the external terminal hole 62*a* is used to connect to the power source side, and the other is used to connect to the load side. As illustrated in FIGS. 1 to 4(*a*), the external terminal hole 61*a* and the external terminal hole 62*a* may be a through hole that is substantially circular in a plan view.

For example, a terminal composed of copper, brass, nickel, or the like may be used as the first terminal 61 and the second terminal 62. It is preferable to use brass as the material for the first terminal 61 and the second terminal 62 from the perspective of strengthening rigidity, and it is preferable to use copper from the perspective of reducing electrical resistance. The first terminal 61 and the second terminal 62 may be composed of the same material or of different materials.

The shape of the first terminal 61 and the second terminal 62 may be any shape that can engage with a terminal on the power source side or a terminal on the load side, which is not illustrated. The shape of the first terminal 61 and the second terminal 62 may be, for example, a claw shape having a partial open portion, or, as illustrated in FIG. 4(*a*), may have a flange portion (illustrated by numerals 61*c* and 62*c* in FIG. 4(*a*)) that widens on both sides toward the fuse element 2 at the end portion which is connected to the fuse element 2, and is not particularly limited. When the first terminal 61 and the second terminal 62 have flanges 61*c*, 62*c*, the first terminal 61 and the second terminal 62 are do not readily come off of the case 6, and the protective element 100 having preferable reliability and durability is obtained.

The fuse element 2 illustrated in FIG. 3 has a uniform thickness (length in the Z direction, illustrated by reference number H23 in FIG. 3). As illustrated in FIG. 3, the thickness of the fuse element 2 may be uniform or may be partially different. Examples of the fuse element having the partially differing thickness include a fuse element in which the thickness gradually thickens from the blowout portion 23 toward the first end portion 21 and the second end portion 22, and the like. Such a fuse element 2 is blown more surely by making the blowout portion 23 a hotspot when an overcurrent flows and making the blowout portion 23 soften by raising the temperature preferentially.

As illustrated in FIG. 4(*a*), the overall planar shape of the fuse element 2 is substantially rectangular, the width 23D in the Y direction of the blowout portion 23 is relatively wide, and the length 2L in the X direction is relatively short compared to a typical fuse element. In the protective element 100 of the present embodiment, arc discharge that occurs when the fuse element 2 fuses becomes small in scale, and therefore, the arc discharge is quickly extinguished (arc extinction). Therefore, it is not necessary to narrow the width 23D of the blowout portion 23 in the Y direction in the fuse element 2 to suppress arc discharge, and the width 23D of the blowout portion 23 in the Y direction in the fuse element 2 can be widened and the length 2L in the X direction can be shortened. The protective element 100 having such a fuse element 2 can suppress the increase of the resistance value in the current path where the protective element 100 is installed. Therefore, the protective element 100 of the present embodiment can be preferably installed in a current path of a large current.

As illustrated in FIG. 4(*a*), the fuse element 2 has a substantially rectangular shape in a plan view. As illustrated in FIG. 4(*a*), a width 21D in the Y direction at a first end portion 21 and a width 22D in the Y direction at a second end portion 22 are made to be substantially the same. Accordingly, the width in the Y direction of the fuse element 2 illustrated in FIG. 4(*a*) signifies the widths 21D, 22D in the Y direction of the first end portion 21 and the second end portion 22.

As illustrated in FIGS. 1, 3, and 4(*a*), the first end portion 21 of the fuse element 2 is disposed overlapping a first terminal 61 in a plan view. Also, the second end portion 22 of the fuse element 2 is disposed overlapping with the second terminal 62 in a plan view.

As illustrated in FIG. 4(*a*), the first end portion 21 extends to the blowout portion 23 side from a region overlapping with the first terminal 61 in the X direction in a plan view. Moreover, as illustrated in FIG. 4(*a*), the second end portion 22 extends to the blowout portion 23 side from a region overlapping with the second terminal 62 in the X direction in a plan view. In the fuse element 2 illustrated in FIG. 4(*a*), the length in the X direction at the second end portion 22 is longer than the length in the X direction at the first end portion 21. Here, the first end portion 21 and the second end portion 22 refer to a portion except the blowout portion 23 of the fuse element 2. That is, a length of the first end portion 21 in the X direction and a length of the second end portion 22 in the X direction refer to lengths from an end of the fuse element 2 in the X direction to the blowout portion 23. Note that, because the first end portion 21 and the second end portion 22 are coupled to the blowout portion 23 by the first coupling portion 25 and the second coupling portion 26 that will be described below, the lengths of the first end portion 21 and the second end portion 22 respectively refer to the lengths from the end of the fuse element 2 in the X direction to the first coupling portion 25 and the second coupling portion 26.

In the present embodiment, an example is described where the length in the X direction at the second end portion 22 is longer than the length in the X direction at the first end portion 21 as the fuse element 2, but the length in the X direction at the first end portion 21 and the length in the X direction at the second end portion 22 may be the same. In other words, in the present embodiment, the blowout portion 23 is disposed near the first terminal 61 side from the X direction center of the fuse element 2, but the blowout portion 23 may be disposed center of the fuse element 2 in the X direction.

As illustrated in FIG. 4(*a*), a first coupling portion 25 that is substantially trapezoidal in a plan view is disposed between the blowout portion 23 and the first end portion 21. The longer side parallel to the first coupling portion 25 that is substantially trapezoidal in a plan view is coupled to the first end portion 21. Moreover, a second coupling portion 26 that is substantially trapezoidal in a plan view is disposed between the blowout portion 23 and the second end portion 22. The longer side parallel to the second coupling portion 26 that is substantially trapezoidal in a plan view is coupled to the second end portion 22. The first coupling portion 25 and the second coupling portion 26 are symmetrical with respect to the blowout portion 23. Thus, the width in the Y direction of the fuse element 2 gradually widens from the blowout portion 23 toward the first end portion 21 and the second end portion 22. As a result, when an overcurrent flows into the fuse element 2, the blowout portion 23 becomes a heat spot, and the temperature of the blowout portion 23 is raised preferentially, leading to being softened and easily blown.

As illustrated in FIG. 4(*a*), the width 23D in the Y direction of the blowout portion 23 of the fuse element 2 is narrower than the widths 21D, 22D in the Y direction of the first end portion 21 and the second end portion 22. Accordingly, the cross-sectional area in the Y direction of the blowout portion 23 is narrower than the cross-sectional area of the region other than the blowout portion 23 of the fuse element 2. Due to this, the blowout portion 23 is more likely to be blown when an overcurrent flows than a region between the blowout portion 23 and the first end portion 21 and a region between the blowout portion 23 and the second end portion 22, that is, a region other than the blowout portion 23 in the fuse element 2.

As illustrated in FIGS. 1 to 4(*a*), the blowout portion 23 of the fuse element 2 is plate-shaped, and the length H23 of the thickness direction (Z direction) of the blowout portion 23 illustrated in FIG. 3 is no greater than the length (width 23D) of the width direction (Y direction) intersecting the thickness direction (Z direction) illustrated in FIG. 4(*a*).

In the present embodiment, as illustrated in FIG. 4(*a*), although an example is described for the fuse element 2 wherein the width 23D in the Y direction in the blowout portion 23 is narrower than widths 21D, 22D in the Y direction of the first end portion 21 and the second end portion 22, the fuse element may have the same width in the Y direction of the blowout portion as the first end and the second end and is not limited to a width in the Y direction of the blowout portion that is narrower than the first end and the second end.

For example, instead of the fuse element 2 illustrated in FIG. 4(*a*), it is possible to provide a linear or strip fuse element having a uniform length in the Y direction. In this case, the length in the thickness direction (Z direction) in the cross-section perpendicular to the X direction (first direction) of the blowout portion of the fuse element is the same as the length in the width direction (Y direction) that intersects the Z direction in the cross-section perpendicular to the X direction.

A material used for a known fuse element such as a metal material containing an alloy may be used as the material of the fuse element 2. Specifically, examples of a material of the fuse element 2 include an alloy having Pb85%/Sn, Sn/Ag3%/Cu0.5%, or the like.

The fuse element 2 is preferably composed of a laminated body in which an inner layer composed of a low melting point metal and an outer layer composed of a high melting point metal are laminated in the thickness direction. In other words, the fuse element 2 is preferably a laminated body in which a high melting point metal is provided so as to surround the low melting point metal. Such fuse element 2 has excellent solderability and is preferable when soldering the first terminal 61 and the second terminal 62 to the fuse element 2.

When the fuse element 2 is composed of the laminated body where an inner layer composed of a low melting point metal and an outer layer composed of a high melting point metal are laminated in the thickness direction, the volume of the low melting point metal is more than the volume of the high melting point metal in terms of overcurrent cutoff characteristics of the fuse element 2.

Sn or a metal having Sn as a main component is preferably used as the low melting point metal used as the material of the fuse element 2. Because the melting point of Sn is 232° C., the metal having Sn as a main component has a low melting point and becomes soft at low temperatures. For example, the solid phase line of the Sn/Ag3%/Cu0.5% alloy is 217° C.

It is preferable to use Ag or Cu or a metal mainly composed of Ag or Cu as the high melting point metal used as the material of the fuse element 2. For example, due to the melting point of Ag being 962° C., the rigidity of the layer composed of the metal having Ag as the main component is maintained at temperatures at which the layer composed of the low melting point metal becomes soft.

The fuse element 2 in the protective element 100 of the present embodiment preferably has a melting temperature of 600° C. or less and more preferably 400° C. or less. When the melting temperature is 600° C. or lower, arc discharge that occurs at the time of fusion of the fuse element 2 becomes smaller in scale.

The fuse element 2 may be manufactured by a known method.

For example, when the fuse element 2 is composed of a laminated body where an inner layer composed of a low melting point metal and an outer layer composed of a high melting point metal are laminated in the thickness direction, it may be manufactured by the method shown below. First, a metal foil composed of a low melting point metal is prepared. Next, a high melting point metal layer is formed on the entire surface of the metal foil using a plating method to obtain a laminated plate. Thereafter, the laminated plate is cut into a predetermined shape. By the above process, the fuse element 2 composed of a laminated body of a three-layer structure is obtained.

(Case)

As illustrated in FIGS. 1 to 3, the case 6 is, substantially, a rectangular parallelepiped and is formed by integrating two members of a first case 6*a* and a second case 6*b* disposed facing the first case 6*a* are integrated.

As illustrated in FIGS. 1 to 3, the blowout portion 23 of the fuse element 2 is housed in a housing portion 60 provided inside the case 6.

As illustrated in FIG. 3, a first insertion hole 64 that opens to a fifth wall surface 60*e* is provided in the housing portion 60, and a second insertion hole 65 that opens to a sixth wall surface 60*f* is provided. The first insertion hole 64 and the second insertion hole 65 are formed by disposing the second case 6*b* and the first case 6*a* facing each other and joining them.

As illustrated in FIG. 3, a first end portion 21 of the fuse element 2 is housed in the first insertion hole 64. A second end portion 22 of the fuse element 2 is housed in the second insertion hole 65.

As illustrated in FIGS. 1 to 3, portions of the first terminal 61 and the second terminal 62 coupled to the fuse element 2 are exposed to the outside of the case 6.

Figure 5:
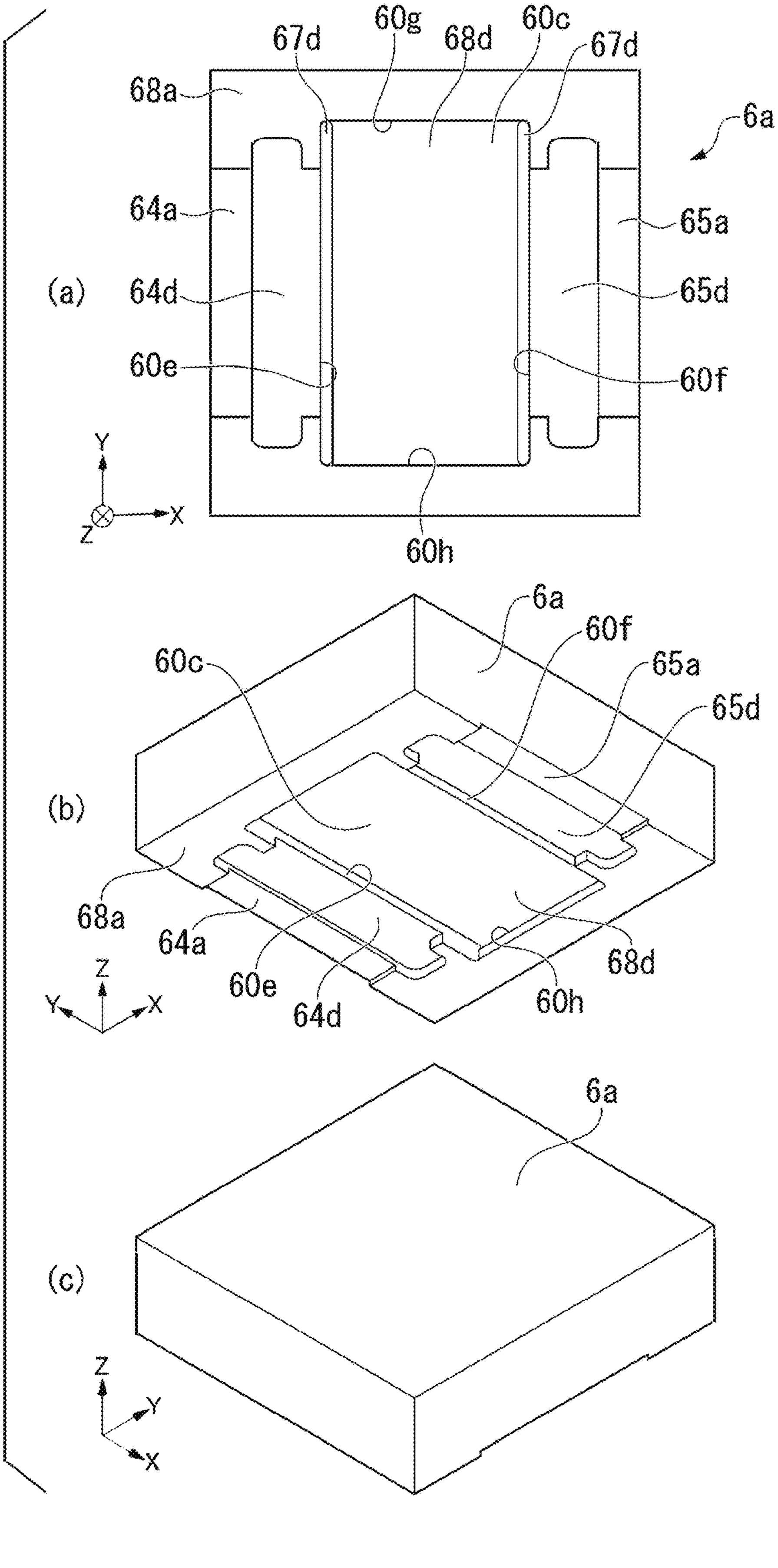
FIG. 5 is a drawing for describing a structure of the first case provided in the protective element 100 of the first embodiment.
Figure 6:
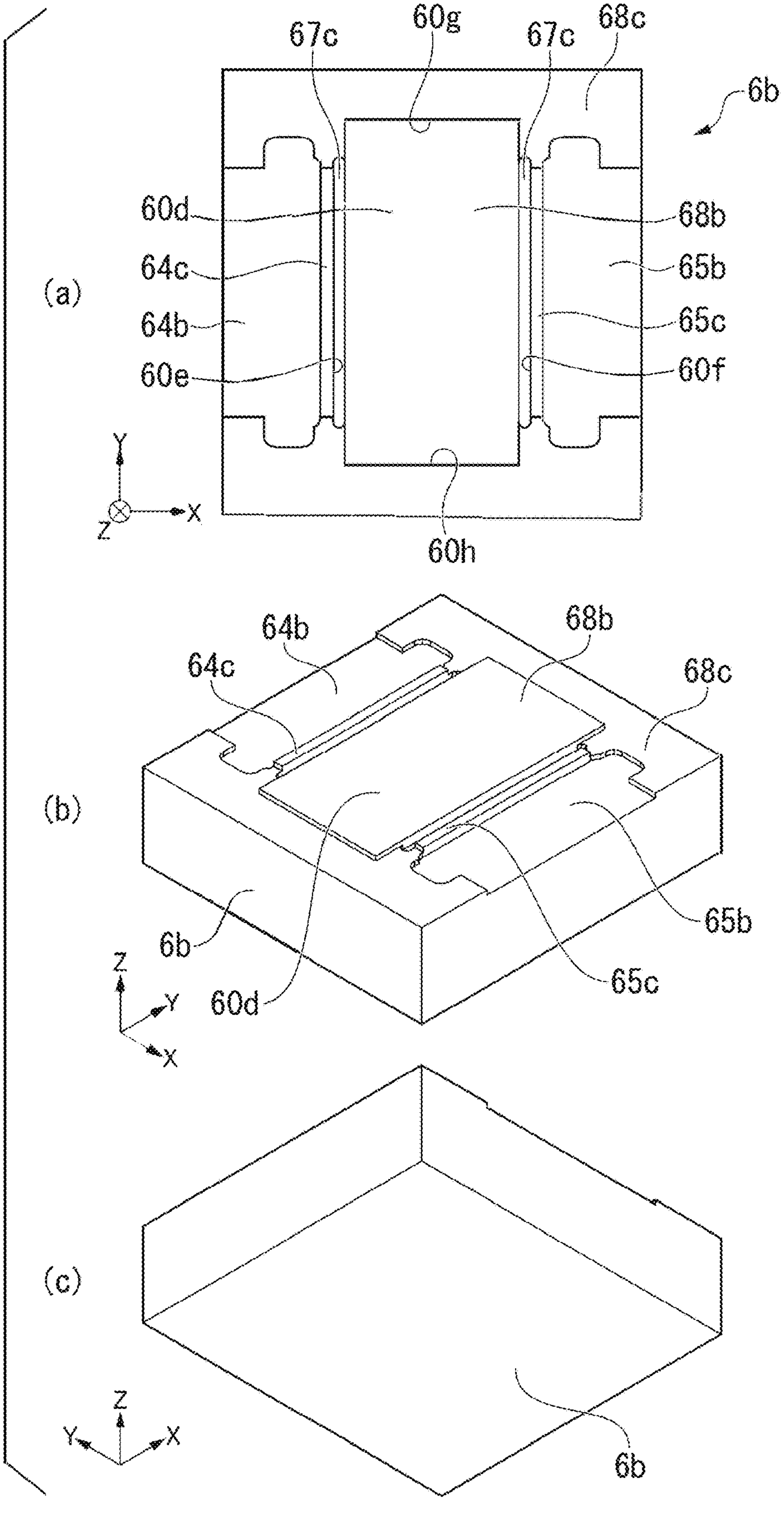
FIG. 6 is a drawing for describing a structure of a second case provided in the protective element 100 of the first embodiment.

FIG. 5 is a drawing for describing a structure of a first case provided in the protective element 100 of the first embodiment. FIG. 5(*a*) is a plan view as seen from the housing portion side, FIG. 5(*b*) is a perspective view as seen from the housing portion side, and FIG. 5(*c*) is a perspective view as seen from the outer surface side. FIG. 6 is a drawing for describing a structure of a second case provided in the protective element 100 of the first embodiment. FIG. 6(*a*) is a plan view as seen from the housing portion side, FIG. 6(*b*) is a perspective view as seen from the housing portion side, and FIG. 6(*c*) is a perspective view as seen from the outer surface side.

As illustrated in FIGS. 1 and 3, the case 6 in the protective element 100 of the present embodiment provides a substantially rectangular parallelepiped housing portion 60 inside that houses the blowout portion 23 of the fuse element 2. The housing portion 60 may be formed by adhering the first case 6*a* and the second case 6*b*.

Moreover, the first case 6*a* and the second case 6*b* may be fixed by a cover that is not illustrated, disposed on an outer side of the case 6.

As illustrated in FIG. 3, a first wall surface 60*c* and a second wall surface 60*d* composed of flat surfaces facing each other in the thickness direction (Z direction) of the blowout portion 23 are provided in the housing portion 60. Furthermore, as illustrated in FIGS. 4(*b*), 5(*a*), 5(*b*), 6(*a*), and 6(*b*), a third wall surface 60*g* and a fourth wall surface 60*h* composed of a flat surface facing each other in the width direction (Y direction) of the blowout portion 23 are provided in the housing portion 60. Furthermore, as illustrated in FIGS. 3, 4(*b*), 5(*a*), 5(*b*), 6(*a*), and 6(*b*), a fifth wall surface 60*e* and a sixth wall surface 60*f* composed of a flat surface facing each other in (the X direction) are provided in the housing portion 60. The third wall surface 60*g* and the fourth wall surface 60*h*, the fifth wall surface 60*e* and the sixth wall surface 60*f* are formed as continuous flat surfaces by securing the first case 6*a* and the second case 6*b*. Here, the first wall surface 60*c,* the second wall surface 60*d,* the third wall surface 60*g*, the fourth wall surface 60*h,* the fifth wall surface 60*e,* and the sixth wall surface 60*f* are surfaces forming the housing portion 60.

In the present embodiment, as illustrated in FIG. 3, the fuse element 2 is placed on the second wall surface 60*d.* Thus, the entire surface 23*b* on the side of the second wall surface 60*d* in the blowout portion 23 of the fuse element 2 is disposed in contact with the second wall surface 60*d.*

In the protective element 100 of the present embodiment, as illustrated in FIG. 3, a space 60*a* is provided between the fuse element 2 and the first wall surface 60*c,* and the distance H6 in the Z direction between the first wall surface 60*c* and the second wall surface 60*d* is 10 times or less the length H23 of the blowout portion 23 in the Z direction. Consequently, the number of lines of electric force generated by arc discharge is sufficiently reduced, and arc discharge that occurs when the fuse element 2 is fused becomes small in scale. Since the distance H6 in the Z direction between the first wall surface 60*c* and the second wall surface 60*d* is short, the protective element 100 can be reduced in size.

In the protective element 100 of the present embodiment, the distance H6 in the Z direction between the first wall surface 60*c* and the second wall surface 60*d* is preferably 5 times or less the length H23 of the blowout portion 23 in the Z direction and is more preferably twice or less because arc discharge becomes even smaller in scale and further size reduction is possible. A distance H6 in the Z direction between the first wall surface 60*c* and the second wall surface 60*d* may be determined according to the application of the protective element 100 such as an installation space of the protective element 100, voltage and current of a current path in which the protective element 100 is installed, and the like.

In the protective element 100 of the present embodiment, as illustrated in FIG. 4(*b*), a center position of a length between the third wall surface 60*g* and the fourth wall surface 60*h* and a center position in the Y direction of the fuse element 2 are disposed so as to substantially match.

As illustrated in FIG. 4(*b*), it is preferred that the positional relationship in the Y direction between the fuse element 2 and the housing portion 60 is disposed so that the center position of the length between the third wall surface 60*g* and the fourth wall surface 60*h* and the center position in the Y direction of the fuse element 2 substantially match, but the positional relationship in the Y direction between the fuse element 2 and the housing portion 60 is not limited to the example illustrated in FIG. 4(*b*) and may be appropriately determined according to the shape and the like of the fuse element 2.

In the protective element 100 of the present embodiment, the distance 60D (see FIG. 4(*b*)) in the width direction (Y direction) of the blowout portion 23 between the third wall surface 60g and the fourth wall surface 60*h* is preferably 1.5 times or more the length (width 21D, 22D) in the Y direction of the fuse element 2. When a distance 60D in the Y direction between the third wall surface 60*g* and the fourth wall surface 60h is 1.5 times or more the width 21D and 22D of the fuse element 2, a pressure rise in the housing portion 60 at the time of fusing of the fuse element 2 is suppressed, and arc discharge is effectively suppressed. The distance 60D in the Y direction between the third wall surface 60*g* and the fourth wall surface 60*h* is preferably twice or more the width 21D and 22D of the fuse element 2.

In the protective element 100 of the present embodiment, the distance 60D in the Y direction between the third wall surface 60*g* and the fourth wall surface 60*h* is preferably 5 times or less the width 21D and 22D of the fuse element 2, and more preferably 4 times or less. When the distance 60D in the Y direction between the third wall surface 60*g* and the fourth wall surface 60*h* is 5 times or less the width 21D and 22D of the fuse element 2, the above distance 60D is not too long, and no hindrance is caused in reducing the size of the protective element 100.

In the protective element 100 of the present embodiment, as illustrated in FIG. 4(*b*), the center position of the length 2L in the X direction excluding the region overlapping with the first terminal 61 and the second terminal 62 of the fuse element 2 in the plan view and the center position of the length 6L in the X direction between the fifth wall surface 60*e* and the sixth wall surface 60*f* are disposed so as to substantially match.

The positional relationship between the fuse element 2 and the housing portion 60 in the X direction is not limited to the example illustrated in FIG. 4(*b*) and may be appropriately determined according to the position of the blowout portion 23 in the X direction of the fuse element 2, and the like.

In the protective element 100 of the present embodiment, the distance 6L (see FIG. 4(*b*)) of the blowout portion 23 in the first direction (X direction) between the fifth wall surface 60*e* and the sixth wall surface 60*f* may be no less than the length of the blowout portion 23 in the X direction and is more preferably 4 times or more the length of the blowout portion 23 in the X direction. The distance 6L between the fifth wall surface 60*e* and the sixth wall surface 60*f* is appropriately determined according to the length in the X direction of the blowout portion 23. The length of the blowout portion 23 in the X direction is an element for determining the resistance value (rated current) of the fuse element 2. Therefore, the length in the X direction of the blowout portion 23 is appropriately set according to the desired overcurrent cutoff characteristics, and a shorter length is preferable.

Further, the distance 6L in the X direction between the fifth wall surface 60*e* and the sixth wall surface 60*f* is preferably not more than a length 2L in the X direction of the fuse element 2 excluding the region overlapping with the first terminal 61 and the second terminal 62 in a plan view. When the first terminal 61 and the second terminal 62 are exposed to the inside of the housing portion 60, arc discharge occurs between the first terminal 61 and the second terminal 62 as well. Because of this, it is preferable that the distance 6L is made to be not more than a length 2L in the X direction of the fuse element 2 excluding the region overlapping the first terminal 61 and the second terminal 62 in a plan view, and that the arc discharge between the first terminal 61 and the second terminal 62 is securely shielded by the insertion hole forming surfaces 64*c,* 65*c.*

The second case 6*b* is, substantially, a rectangular parallelepiped and has a second convex portion 68*b* that forms the housing portion 60 as illustrated in FIGS. 3, 6(*a*), and 6(*b*). The second convex portion 68*b* is rectangular in a plan view as illustrated in FIGS. 6(*a*) and 6(*b*). As illustrated in FIG. 3, the second convex portion 68*b,* by being joined to the first case 6*a,* makes the first short side an end surface of the third wall surface 60*g,* makes the second short side an end surface of the fourth wall surface 60*h*, makes the first long side an end surface of the fifth wall surface 60*e,* and makes the second long side an end surface of the sixth wall surface 60*f.*

The top of the second convex portion 68*b* becomes a second wall surface 60*d* by being joined to the first case 6*a*.

As illustrated in FIG. 6(*a*) and FIG. 6(*b*), leak prevention grooves 67*c* are respectively provided along the fifth wall surface 60*e* and the sixth wall surface 60*f* in a joint portion with the fifth wall surface 60*e* in the second wall surface 60*d* and a joint portion with the sixth wall surface 60*f* in the second wall surface 60*d*. The two leak prevention grooves 67*c* are disposed facing each other in the X direction in a plan view. The leak prevention groove 67*c* divides the electric conduction path formed by the adhering matter to prevent the leak current when the melted fuse element 2 is scattered and the scattered matter adheres to the housing portion 60 when the fuse element 2 is fused.

In the protective element 100 of the present embodiment, it is preferable to provide a leak prevention groove 67*c*, but the leak prevention groove 67*c* is not necessary. Further, the leakage prevention grooves 67*c* are preferably located along the joint portion of the fifth wall 60*e* on the second wall 60*d* and the joint portion of the sixth wall 60*f* on the second wall 60*d*, but they may be at other locations on the second convex portion 68*b*, and may be at only one of the two leakage prevention grooves 67*c*. When the leak prevention groove 67*c* is located along the joint portion between the fifth wall surface 60*e* on the second wall surface 60*d* and the joint portion between the sixth wall surface 60*f* on the second wall surface 60*d*, the scattered matter adhering to the inside of the housing portion 60 when the fuse element 2 is fused can be effectively prevented from being electrically connected to the first terminal 61 or the second terminal 62, and thus the formation of a new electric conduction path can be effectively prevented.

As illustrated in FIG. 4(*b*), the length in the Y direction of the leak prevention groove 67*c* is preferably longer than the width 21D in the Y direction of the first end portion 21 and the width 22D in the Y direction of the second end portion 22 of the fuse element 2. In this case, the scattered matter adhering to the inside of the housing portion 60 when the fuse element 2 is fused can be more effectively prevented from being electrically connected to the first terminal 61 or the second terminal 62, and the generation of the leak current can be more effectively prevented.

The leak prevention groove 67*c* is formed with a substantially constant width and depth. The width and the depth of the leak prevention groove 67*c* are not particularly limited so long as an electric conduction path formed by the adhering matter scattered when the fuse element 2 is fused is parted by the leak prevention groove 67*c*, thereby preventing a leak current.

As illustrated in FIGS. 6(*a*) and 6(*b*), respectively, insertion hole forming surfaces 64*c*, 65*c* are provided on an outer side in the X direction in a plan view of the leak prevention groove 67*c* on an opposing surface of the second case 6*b* that faces the first case 6*a*. The two insertion hole forming surfaces 64*c*, 65*c* are disposed facing each other in the X direction in a plan view.

As illustrated in FIG. 4(*b*), the length in the Y direction of the two insertion hole forming surfaces 64*c*, 65*c* is longer than the width 21D in the Y direction of the first end portion 21 and the width 22D in the Y direction of the second end portion 22 of the fuse element 2. Thus, the entire surfaces in the width 21D and 22D direction of the first end portion 21 and the second end portion 22 of the fuse element 2 are disposed in contact with the insertion hole forming surfaces 64*c*, 65*c*.

As illustrated in FIG. 6(*b*), the insertion hole forming surfaces 64*c*, 65*c* are provided in a position closer to the first wall surface 60*c* in the Z direction than the second joint surface 68*c* that is adhered to the first case 6*a*. Thus, a step is formed at the boundary portion between the insertion hole forming surfaces 64*c*, 65*c* and the second joint surface 68*c*, respectively.

In the protective element 100 of the present embodiment, a dimension of a step between the boundary portion between the insertion hole forming surfaces 64*c*, 65*c* and the second joint surface 68*c* is the same as a height dimension of the top of the second convex portion 68*b* from the second joint surface 68*c*.

As illustrated in FIGS. 6(*a*) and 6(*b*), a terminal mounting surface 64*b* is provided on the outer side in the X direction of the insertion hole forming surface 64*c*. Further, a terminal mounting surface 65*b* is provided on the outer side in the X direction of the insertion hole forming surface 65*c*.

As illustrated in FIG. 6(*b*), the terminal mounting surfaces 64*b*, 65*b* are provided in a position farther from the first wall surface 60*c* in the Z direction than the surfaces of the insertion hole forming surfaces 64*c*, 65*c*. Thus, a step is formed at the boundary portion between the terminal mounting surfaces 64*b*, 65*b* and the insertion hole forming surfaces 64*c*, 65*c*, respectively.

On the surface of the second case 6*b* that faces the first case 6*a*, the outer side in the Y direction in a plan view of the third wall surface 60*g* and the fourth wall surface 60h is a second joint surface 68*c* that is adhered to the first case 6*a*. The second joint surface 68*c* is provided along the edge of the second case 6*b*.

The first case 6*a* is substantially a rectangular parallelepiped. As illustrated in FIGS. 3, 5(*a*), and 5(*b*), the housing portion 60 is formed by abutting the first joint surface 68*a* of the first case 6*a* and the second joint surface 68*c* of the second case 6*b*. The housing portion 60 is composed of a space that is rectangular in a plan view and is surrounded by a second convex portion 68*b* of the second case 6*b* and a first concave portion 68*d* of the first case 6*a*.

The first concave portion 68*d* is rectangular in a plan view as illustrated in FIG. 5(*a*). The planar shape of the first concave portion 68*d* of the first case 6*a* is the same as the planar shape of the second convex portion 68*b* of the second case 6*b*. As illustrated in FIGS. 5(*a*) and 5(*b*), the first short side is the third wall surface 60*g*, the second short side is the fourth wall surface 60*h*, the first long side is the fifth wall surface 60*e*, and the second long side is the sixth wall surface 60*f* in the first concave portion 68*d*. The bottom surface of the first concave portion 68*d* becomes a first wall surface 60*c* by joining the first case 6*a* and the second case 6*b*.

As illustrated in FIG. 5(*a*), leak prevention grooves 67*d* are respectively provided along a fifth wall surface 60*e* and a sixth wall surface 60*f* in a joint portion with the fifth wall surface 60*e* and a joint portion with the sixth wall surface 60*f* on the first wall surface 60*c*. The two leak prevention grooves 67*d* are disposed facing each other in the X direction in a plan view. The leak prevention groove 67*d*, similar to the leak prevention groove 67*c* provided in the first case 6*a*, prevents a leak current by dividing an electric conduction path formed by an adhering matter when the melted fuse element 2 is scattered at the time of fusion of the fuse element 2 and the scattered matter adheres to the housing portion 60.

As illustrated in FIG. 4(*b*), the length in the Y direction of the leak prevention groove 67*d* is the same as the distance 60D in the Y direction between the third wall surface 60*g* and the fourth wall surface 60*h*. Thus, the leak prevention groove 67*d* can be easily formed. The length of the leak prevention groove 67*d* in the Y direction may be shorter than the distance 60D in the Y direction between the third wall surface 60*g* and the fourth wall surface 60*h*, but preferably longer than the width 21D in the Y direction of the first end portion 21 of the fuse element 2 and the width 22D in the Y direction of the second end portion 22. In this case, the scattered matter adhering to the inside of the housing portion 60 when the fuse element 2 is fused can be more effectively prevented from being electrically connected to the first terminal 61 or the second terminal 62, and the generation of the leak current can be more effectively prevented.

In the present embodiment, as illustrated in FIG. 4(*b*), a longitudinal central portion of a leak prevention groove 67*d* provided in the first case 6*a* is disposed facing a longitudinal central portion of a leak prevention groove 67*c* of the second case 6*b*. The length-direction end of the leak prevention groove 67*d* is disposed so as to face the first joint surface 68*a* of the first case 6*a*.

In the protective element 100 of the present embodiment, it is preferable that a leak prevention groove 67*d* is provided, but there is no need for a leak prevention groove 67*d*. Further, the leakage prevention grooves 67*d* are preferably located along the joint portion of the fifth wall surface 60*e* on the first wall surface 60*c* and the joint portion of the sixth wall surface 60*f* on the first wall surface 60*c*, but they may be at other locations on the bottom of the first concave portion 68*d* or only one of the two leakage prevention grooves 67*d*. When the leak prevention groove 67*d* is provided along the joint portion between the fifth wall surface 60*e* the first wall surface 60*c* and the joint portion between the sixth wall surface 60*f* on the first wall surface 60*c*, the scattered matter adhering to the wall surface of the housing portion 60 when the fuse element 2 is fused can be effectively prevented from being electrically connected to the first terminal 61 or the second terminal 62, and thus the formation of a new electric conduction path can be effectively prevented.

A leak prevention groove 67*d* provided in the first case 6*a* is formed with a substantially constant width and depth. The width of the leak prevention groove 67*d* provided in the first case 6*a* may be the same as or different from the width of the leak prevention groove 67*c* provided in the second case 6*b*. The width and the depth of the leak prevention groove 67*d* are not particularly limited so long as the leak prevention groove 67*d* divides an electric conduction path formed by the adhering matter scattered when the fuse element 2 is fused to prevent leakage.

As illustrated in FIGS. 5(*a*) and 5(*b*), insertion hole forming surfaces 64*d*, 65*d* are respectively provided on the outer side in the X direction in a plan view of the leak prevention groove 67*d* on an opposing surface of the first case 6*a* that faces the second case 6*b*. The two insertion hole forming surfaces 64*d*, 65*d* are disposed facing each other in the X direction in a plan view.

As illustrated in FIG. 5(*b*), the insertion hole forming surfaces 64*d*, 65*d* are provided at positions closer to the first wall surface 60*c* in the Z direction than the first joint surface 68*a*. Thus, a step is formed at the boundary portion between the insertion hole forming surfaces 64*d*, 65*d* and the first joint surface 68*a*, respectively.

As illustrated in FIGS. 5(*a*) and 5(*b*), a terminal mounting surface 64*a* is provided on the outer side in the X direction of the insertion hole forming surface 64*d*. Moreover, a terminal mounting surface 65*a* is provided on the outer side in the X direction of the insertion hole forming surface 65*d*.

As illustrated in FIG. 5(*b*), the terminal mounting surfaces 64*a*, 65*a* are provided in a position closer to the first joint surface 68*a* in the Z direction than the insertion hole forming surfaces 64*d*, 65*d*, and in a position closer to the first wall surface 60*c* in the Z direction than the first joint surface 68*a*. Thus, a step is formed at boundary portion between the terminal mounting surfaces 64*a*, 65*a* and the insertion hole forming surfaces 64*d*, 65*d* and the first joint surface 68*a*, respectively.

As illustrated in FIG. 3, the insertion hole forming surface 64*d* of the first case 6*a* forms a first insertion hole 64 in the first wall surface 60*c* by being disposed facing the insertion hole forming surface 64*c* of the second case 6*b*. The insertion hole forming surface 65*d* of the first case 6*a* forms a second insertion hole 65 in the second wall surface 60*d* by being disposed facing the insertion hole forming surface 65*c* of the second case 6*b*.

As illustrated in FIG. 3, the fuse element 2 is disposed between the insertion hole forming surface 64*c* and the insertion hole forming surface 64*d*, and between the insertion hole forming surface 65*c* and the insertion hole forming surface 65*d*.

Furthermore, as illustrated in FIG. 3, the first terminal 61 is disposed between the terminal mounting surface 64*b* and the terminal mounting surface 64*a*. The second terminal 62 is disposed between the terminal mounting surface 65*b* and the terminal mounting surface 65*a*.

On the surface of the first case 6*a* that faces the second case 6*b*, the outer side in the Y direction in a plan view of the third wall surface 60*g* and the fourth wall surface 60h is a first joint surface 68*a* that is fixed to the second case 6*b*. The first joint surface 68*a* is provided along the edge of the first case 6*a*.

The first case 6*a* and the second case 6*b* forming the case 6 are made of an insulating material. A ceramic material, a resin material, or the like may be used as the insulating material.

Examples of the ceramic material include alumina, mullite, zirconia, and the like, and it is preferable to use a material having a high thermal conductivity such as alumina. When the first case 6*a* and the second case 6*b* are formed by a material having a high thermal conductivity such as a ceramic material, the heat generated when the fuse element 2 is blown out can be efficiently dissipated to the outside, and the continuation of the arc discharge generated when the fuse element 2 is blown out can be more effectively suppressed.

It is preferable to use any one kind selected from a polyphenylene sulfide (PPS) resin, a nylon resin, a fluorine resin such as polytetrafluoroethylene, and a polyphthalamide (PPA) resin as the resin material, and it is particularly preferable to use a nylon resin.

An aliphatic polyamide or a semi-aromatic polyamide may be used as the nylon resin. When an aliphatic polyamide containing no benzene ring is used as the nylon resin, graphite is less likely to be produced even when the first case 6*a* and/or the second case 6*b* are burned by arc discharge generated when the fuse element 2 is fused compared to when a semi-aromatic polyamide having a benzene ring is used. Thus, by forming the first case 6*a* and the second case 6*b* using the aliphatic polyamide, it is possible to prevent a new electric conduction path from being formed by graphite generated when the fuse element 2 is fused.

For example, nylon 4, nylon 6, nylon 46, nylon 66, or the like may be used as the aliphatic polyamide.

For example, nylon 6T, nylon 9T, or the like may be used as the semi-aromatic polyamide.

Among these nylon resins, it is preferable to use a resin that does not contain a benzene ring such as nylon 4, nylon 6, nylon 46, nylon 66 and the like that are aliphatic polyamides, and because they have excellent heat resistance, it is more preferable to use nylon 46 or nylon 66.

It is preferable to use a resin material having a tracking resistance index CTI (Comparative Tracking Index) of 400 V or more as the resin material, and more preferable to use a resin material having a tracking index CTI of 600 V or more. The tracking resistance can be found by a test based on IEC60112.

It is preferable that the nylon resin have particularly high tracking resistance (resistance against tracking (carbonized conducting path) breakdown) even among resin materials.

It is preferable to use a material having a high glass transition temperature as the resin material. The glass transition temperature (Tg) of the resin material is the temperature at which it changes from a soft, rubbery state to a hard, glassy state. When the resin is heated to the glass transition temperature or higher, the molecules move easily and it reaches a soft, rubbery state. On the other hand, when the resin cools, movement of the molecules is limited and it reaches a hard, glassy state.

When the first case 6*a* and the second case 6*b* are formed by a material having a high thermal conductivity such as a ceramic material, the heat generated when the fuse element 2 is blown out can be efficiently dissipated to the outside. Therefore, the continuation of the arc discharge generated when the fuse element 2 is blown out can be more effectively suppressed.

The first case 6*a* and the second case 6*b* may be manufactured by a known method.

(Manufacturing Method of Protective Element)

Next, a manufacturing method of the protective element 100 of the present embodiment will be described with an example.

In order to manufacture the protective element 100 of the present embodiment, a fuse element 2, a first terminal 61, and a second terminal 62 are prepared. Then, as illustrated in FIG. 4(*a*), the first terminal 61 is connected to the first end portion 21 of the fuse element 2 by soldering. Furthermore, the second terminal 62 is connected to the second end portion 22 by soldering.

A known solder material may be used as the solder material used for soldering in the present embodiment, and from the perspective of resistivity, melting point, and having a lead-free environment, it is preferable to use a solder material that has Sn as a main component.

The first end portion 21 and the second end portion 22 of the fuse element 2, and the first terminal 61 and the second terminal 62 may be connected by joining by welding, and a known joining method may be used.

Next, a first case 6*a* illustrated in FIGS. 5(*a*) to 5(*c*) and a second case 6*b* illustrated in FIGS. 6(*a*) to 6(*c*) are prepared. Further, as illustrated in FIG. 2, a member where the fuse element 2, and the first terminal 61 and the second terminal 62 are integrated is installed on the second case 6*b*. As illustrated in FIG. 2, the member is installed so that the first terminal 61 and the second terminal 62 are arranged more to the second wall surface 60*d* side than the fuse element 2.

In the present embodiment, as illustrated in FIG. 3, the fuse element 2, the first terminal 61, and the second terminal 62 are aligned with the second case 6*b* by placing the first terminal 61 on the terminal mounting surface 64*b* and placing the second terminal 62 on the terminal mounting surface 65*b* (see FIG. 2). Thus, as illustrated in FIG. 4(*b*), the member is disposed so that the center position of the length 2L in the X direction excluding the region overlapping with the first terminal 61 and the second terminal 62 of the fuse element 2 in the plan view and the center position of the length 6L in the X direction between the fifth wall surface 60*e* and the sixth wall surface 60*f* match, and so that the center position of the length between the third wall surface 60*g* and the fourth wall surface 60*h* and the center position in the Y direction of the fuse element 2 match.

Afterward, the first case 6*a* and the second case 6*b* are joined (see FIG. 3). An adhesive may be used for joining the first case 6*a* and the second case 6*b*. For example, an adhesive containing a thermosetting resin may be used as the adhesive. A method of winding an adhesive tape made of a resin such as polyimide on the outer surface of the first case 6*a* and the second case 6*b* may be used for joining the first case 6*a* and the second case 6*b*. An adhesive and an adhesive tape may both be used for joining the first case 6*a* and the second case 6*b*.

When joining the first case 6*a* and the second case 6*b*, the leak prevention groove 67*c* provided in the second case 6*b* and the center of the leak prevention groove 67*d* provided in the first case 6*a* are disposed and joined so as to overlap in a plan view (see FIG. 4(*b*)).

The first case 6*a* and the second case 6*b* may be fixed by a cover that is not illustrated, disposed on an outer side of the case 6.

By joining the first case 6*a* and the second case 6*b*, a housing portion 60 surrounded by the second convex portion 68*b* of the second case 6*b* and the first concave portion 68*d* of the first case 6*a* is formed in the case 6. At this time, in the protective element 100 of the present embodiment, the top part of the second convex portion 68*b* of the second case 6*b* (in other words, the second wall surface 60*d*) and the insertion hole forming surfaces 64*c*, 65*c* are disposed at a position closer to the first wall surface 60*c* than the first joint surface 68*a* of the first case 6*a* in the Z direction (see FIGS. 3, 5(*b*), and 6(*b*)).

Furthermore, by joining the first case 6*a* and the second case 6*b*, as illustrated in FIG. 3, the first end portion 21 of the fuse element 2 is housed in the first insertion hole 64, the second end portion 22 of the fuse element 2 is housed in the second insertion hole 65, and a portion of the first terminal 61 and the second terminal 62 connected to the fuse element 2 is exposed to the outside of the case 6 (see FIG. 1).

The protective element 100 of the present embodiment is obtained by the above process.

(Operation of Protective Element)

Next, operation of the protective element 100 in a situation where a current exceeding a rated current flows through the fuse element 2 of the protective element 100 of the present embodiment will be described.

When a current exceeding a rated current flows through the fuse element 2 of the protective element 100 of the present embodiment, the temperature of the fuse element 2 is raised by the heat generated by the overcurrent. When the blowout portion 23 of the fuse element 2 is melted by temperature increase, the fuse element 2 is fused. At this time, sparks are generated between the blowout surfaces of the blowout portion 23, and arc discharge is generated.

In the protective element 100 of the present embodiment, as illustrated in FIG. 3, the distance H6 in the Z direction between the first wall surface 60*c* and the second wall surface 60*d* provided on the housing portion 60 of the case 6 is 10 times or less the length H23 of the blowout portion 23 of the fuse element 2 in the Z direction. Therefore, the amount of transfer charge generated by arc discharge is small, and arc discharge becomes small.

As described above, the protective element 100 of the present embodiment is provided with the fuse element 2, which has the blowout portion 23 between the first end portion 21 and the second end portion 22 and is energized in the first direction (X direction) from the first end portion 21 toward the second end portion 22, and the case 6, which is made of an insulating material and has the housing portion 60 provided inside that houses the blowout portion 23. In the protective element 100 of the present embodiment, the length H23 in the thickness direction (Z direction) in a cross-section perpendicular to the first direction (X direction) of the blowout portion 23 is no greater than the length in the width direction (Y direction) that intersects the thickness direction (Z direction) in a cross-section perpendicular to the first direction (X direction), the housing portion 60 is provided with the first wall surface 60*c* and the second wall surface 60*d* composed of flat surfaces facing each other in the Z direction, and the distance H6 in the Z direction between the first wall surface 60*c* and the second wall surface 60*d* is no more than 10 times the length H23 in the Z direction of the blowout portion 23. Thus, the effects shown below are obtained.

That is, in the protective element 100 of the present embodiment, arc discharge generated when the fuse element 2 fuses becomes small. Therefore, in the protective element 100 of the present embodiment, the housing portion 60 can be prevented from breaking down due to the pressure increase in the housing portion 60, and has excellent safety. Moreover, the protective element 100 of the present embodiment may be preferably installed in a current path having a high voltage of 100 V or higher and a large current of 100 A or higher, for example.

Moreover, the protective element 100 of the present embodiment may be reduced in size since the distance H6 in the Z direction between the first wall surface and the second wall surface 60*d* is short. Furthermore, since the protective element 100 of the present embodiment has a small arc discharge, the thickness between the housing portion 60 of the case 6 and the outer surface can be reduced and the size can be reduced. Therefore, according to the protective element 100 of the present embodiment, the material used in the case 6 can be reduced.

Moreover, in the protective element 100 of the present embodiment, the entire surface 23*b* on the side of the second wall surface 60*d* in the blowout portion 23 of the fuse element 2 is disposed in contact with the second wall surface 60*d*. Therefore, in the protective element 100 of the present embodiment, the number of lines of electric force on the surface 23*b* on the side of the second wall surface 60*d* of the blowout portion 23 generated by arc discharge decreases, and heat generated when the fuse element 2 is blown out can be efficiently dissipated to the outside via the second wall surface 60*d*. Consequently, arc discharge generated when the fuse element 2 is fused is made smaller. Moreover, when the entire surface 23*b* on the side of the second wall surface 60*d* in the blowout portion 23 is disposed in contact with the second wall surface 60*d*, the distance H6 in the Z direction between the first wall surface 60*c* and the second wall surface 60*d* can be made shorter, and further miniaturization is possible.

In the protective element 100 of the present embodiment, it is more preferable that the fuse element 2 is made of a laminated body where an inner layer made of Sn or a metal whose main component is Sn and an outer layer made of Ag or Cu or a metal whose main component is Ag or Cu, are laminated in the thickness direction, and that the case 6 is formed of a resin material. With this type of protective element, for the reasons given below, arc discharge generated when the fuse element 2 fuses becomes even smaller, and further miniaturization is possible.

In other words, when the fuse element 2 is made of the above laminated body, the fusing temperature of the fuse element 2 lowers to, for example, 300 to 400° C.

Accordingly, even when the case 6 is made of a resin material, sufficient heat resistance can be obtained. Furthermore, because the fusing temperature of the fuse element 2 is low, even when the distance H6 in the Z direction between the first wall surface 60*c* and the second wall surface 60*d* in the housing portion 60 is no more than 10 times the length H23 of the blowout portion 23 in the Z direction, and furthermore, the first wall surface 60*c* and/or the second wall surface 60*d* are arranged in contact with the blowout portion 23 of the fuse element 2, the fuse element 2 reaches the fusing temperature in a short time. Therefore, the distance H6 in the Z direction between the first wall surface 60*c* and the second wall surface 60*d* in the housing portion 60 can be sufficiently shortened without causing any trouble in the function of the fuse element 2.

Moreover, in such a protective element, the resin material forming the case 6 decomposes due to the heat accompanying the blowout of the fuse element 2 and generates thermal decomposition gas, and the inside of the housing portion 60 is cooled by the vaporization heat (ablation effect by the resin). As a result, the arc discharge becomes smaller. Therefore, in the protective element in which the fuse element 2 is made of the above laminated body and the case 6 is formed by a resin material, the distance H6 in the Z direction between the first wall surface 60*c* and the second wall surface 60*d* in the housing portion 60 is shortened, making arc discharge smaller and further miniaturization possible.

Nylon 46, nylon 66, polyacetal (POM), polyethylene terephthalate (PET), and the like may be cited as resin materials that can easily obtain the ablation effect by heat accompanying the fusing of the fuse element 2. Note that nylon 46 or nylon 66 is preferably used as the resin material forming the case from the perspective of heat resistance and flame retardancy.

A more effective ablation effect due to the resin can be obtained when the distance 60D (see FIG. 4(*b*)) in the Y direction between the third wall surface 60*g* and the fourth wall surface 60*h* in the housing portion 60 is 1.5 times or more the length (width 21D, 22D) in the Y direction of the fuse element 2. This is presumed to be because even when the distance 60D in the Y direction in the housing portion 60 is made longer, the effect on the number of lines of electric force generated by arc discharge is small, but the surface area in the housing portion 60 increases significantly, and decomposition of the resin material is promoted by the heat that accompanies the fusing of the fuse element 2.

In contrast, for example, with a protective element where the fuse element is made of Cu and the case is made of a ceramic material, there are cases where miniaturization is difficult for the reasons given below.

In other words, when the fuse element is made of Cu, the fusing temperature of the fuse element becomes a high temperature of 1000° C. or more. Therefore, when a resin material is used as the material for the case, there is a possibility that the heat resistance of the case will be insufficient. Accordingly, a ceramic material that is a material having excellent heat resistance is used as a material for the case.

In this protective element, the fusing temperature of the fuse element is high, and since the ceramic material is used as the material of the case, when the distance between the blowout portion of the fuse element and the inner surface of the case is made close, the heat generated in the blowout portion is dissipated through the case, and the fuse element becomes less likely to reach the fusing temperature. Therefore, a sufficient distance must be secured between the blowout portion and the inner surface of the case. Therefore, in the protective element in which the fuse element is made of Cu and the case is made of a ceramic material, a wide housing portion must be provided in the case.

Moreover, when a sufficient distance is secured between the blowout portion and the inner surface of the case, the number of lines of electric force generated by arc discharge is increased, and therefore, arc discharge generated when the fuse element is blown out becomes large. Therefore, there are times when it is necessary to insert an arc extinguishing agent in the housing portion within the case in order to quickly extinguish (arc extinguish) arc discharge. When inserting an arc extinguishing agent in the case, a space for housing the arc extinguishing agent in the case must be secured. Because of this, a wider housing portion must be provided in the case, and there are cases where it becomes even more difficult to miniaturize.

Second Embodiment

Figure 7:
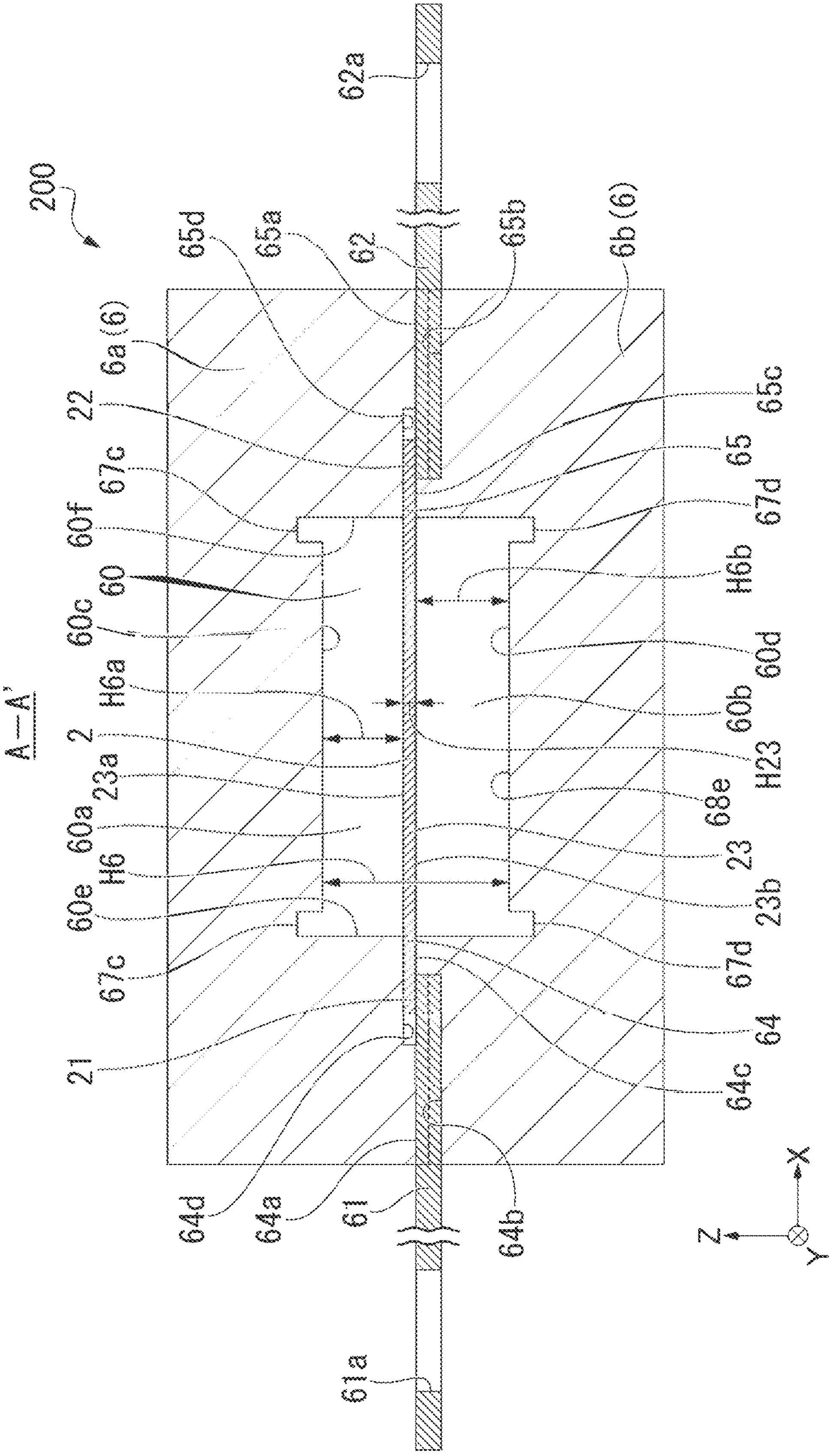
FIG. 7 is a cross-sectional view for describing the protective element 200 of a second embodiment and is a cross-sectional view corresponding to a position where the protective element 100 according to the first embodiment is cut along the line A-A' illustrated in FIG. 1.

FIG. 7 is a cross-sectional view for describing the protective element 200 of the second embodiment, and is a cross-sectional view corresponding to a position where the protective element 100 according to the first embodiment is cut along the A-A' line illustrated in FIG. 1.

In the protective element 200 according to the second embodiment, a member that is the same as the protective element 100 according to the first embodiment described above is given the same reference sign, and a description thereof is omitted.

The protective element 200 according to the second embodiment is different from the protective element 100 according to the first embodiment in that a space 60*a* is not only provided between the fuse element 2 and the first wall surface 60*c*, but also a space 60*b* is provided between the fuse element 2 and the second wall surface 60*d*.

The housing portion 60 in the protective element 200 of the present embodiment, as illustrated in FIG. 7, is provided with a first wall surface 60*c* and a second wall surface 60*d* composed of flat surfaces opposing each other in the thickness direction (Z direction) of the blowout portion 23.

In the protective element 200 of the present embodiment, similarly to the protective element 100 of the first embodiment, the distance H6 in the Z direction between the first wall surface 60*c* and the second wall surface 60*d* is 10 times or less the length H23 of the blowout portion 23 in the Z direction. In the protective element 200 of the present embodiment as well, the distance H6 in the Z direction between the first wall surface 60*c* and the second wall surface 60*d* is preferably 5 times or less the length H23 of the blowout portion 23 in the Z direction, and is more preferably twice or less.

In the protective element 200 of the present embodiment, as illustrated in FIG. 7, the distance H6*a* between the fuse element 2 and the first wall surface 60*c* and the distance H6*b* between the fuse element 2 and the second wall surface 60*d* are substantially the same. The distance H6*a* between the fuse element 2 and the first wall surface 60*c* and the distance H6*b* between the fuse element 2 and the second wall surface 60*d* may be different, and either of the distance H6*a* or the distance H6*b* may be longer.

In the protective element 200 of the present embodiment, as illustrated in FIG. 7, a space 60*b* is provided between the fuse element 2 and the second wall surface 60*d*. Because of this, a second concave portion 68*e* illustrated in FIG. 7 is provided in the protective element 200 of the present embodiment instead of the second convex portion 68*b* (see FIG. 3) provided in the second case 6*b* in the protective element 100 according to the first embodiment.

The planar shape of the second concave portion 68*e* is rectangular in a plan view and is the same shape as the planar shape of the first concave portion 68*d* of the first case 6*a* and the second convex portion 68*b* illustrated in FIGS. 6(*a*) and 6(*b*).

The first short side is the third wall surface 60*g*, the second short side is the fourth wall surface 60*h*, and as illustrated in FIG. 7, the first long side is the fifth wall surface 60*e*, and the second long side is the sixth wall surface 60*f* in the second concave portion 68*e*. As illustrated in FIG. 7, the bottom surface of the second concave portion 68*e* becomes a second wall surface 60*d* by joining the first case 6*a* and the second case 6*b*.

The depth of the second concave portion 68*e* corresponds to the distance H6*b* between the fuse element 2 and the second wall surface 60*d*.

The protective element 200 of the present embodiment can be manufactured in a manner similar to that of the protective element 100 of the first embodiment by using a case provided with a second concave portion 68*e* illustrated in FIG. 7 instead of the second convex portion 68*b* illustrated in FIGS. 6(*a*) and 6(*b*) as the second case 6*b*.

In the protective element 200 of the present embodiment, similarly to the protective element 100 of the first embodiment, the distance H6 in the Z direction between the first wall surface 60*c* and the second wall surface 60*d* provided on the housing portion 60 of the case 6 is 10 times or less the length H23 of the blowout portion 23 of the fuse element 2 in the Z direction. Because of this, with the protective element 200 of the present embodiment as well, similarly to the protective element 100 of the first embodiment, arc discharge generated when the fuse element 2 fuses becomes smaller, and miniaturization is possible.

Other Examples

The protective element of the present invention is not limited to the protective elements of the above first embodiment and second embodiment.

For example, in the protective element 100 of the first embodiment described above, as illustrated in FIG. 3, an example is described where a space 60*a* is provided between the fuse element 2 and the first wall surface 60*c*, and the entire surface 23*b* of the second wall surface 60*d* side in the blowout portion 23 of the fuse element 2 is disposed in contact with the second wall surface 60*d*, but in the protective element of the present invention, a space may be provided between the fuse element 2 and the second wall surface 60*d* illustrated in FIG. 3, and the surface on the first wall surface side of the blowout portion 23 may be disposed in contact with the first wall surface 60*c*.

Furthermore, with the protective element of the present invention, the surface 23*b* of the second wall surface 60*d* side of the blowout portion 23 illustrated in FIG. 3 may be disposed in contact with the second wall surface 60*d*, and the surface of the first wall surface 60*c* side of the blowout portion 23 may be disposed in contact with the first wall surface 60*c*. In this case, the number of lines of electric force on the surface 23*b* of the second wall surface 60*d* side of the blowout portion 23 generated by arc discharge is decreased, and the number of lines of electric force on the surface 23*b* of the first wall surface 60*c* side of the blowout portion 23 generated by arc discharge is decreased. Moreover, heat generated when the fuse element 2 is blown out is efficiently dissipated to the outside through the second wall surface 60*d* and the first wall surface 60*c*. As a result, arc discharge generated when the fuse element 2 is fused is made smaller. Moreover, because a surface 23*b* of the second wall surface 60*d* side and a surface of the first wall surface 60*c* side in the blowout portion 23 are disposed in contact with the inner surface of the housing portion 60, the distance H6 in the thickness direction (Z direction) between the first wall surface 60*c* and the second wall surface 60*d* becomes the shortest. Thus, with this type of protective element, arc discharge generated when the fuse element 2 fuses becomes even smaller, and further miniaturization is possible.

Furthermore, the protective element of the present invention may be provided with a shielding mechanism as needed. For example, a slider component having an opening through which the fuse element is arranged is an example of the shielding mechanism. The slider component is moved in the Z direction orthogonal to the energization direction of the fuse element at the time of fusing to physically close the first insertion hole. Thus, the blowout surfaces of the blown out fuse elements are insulated from each other, and arc discharge generated when the fuse elements are fused is quickly extinguished (arc extinguished).

EXAMPLES

The present invention will be described more specifically below using examples and comparative examples. Note that the present invention is not limited to only the following examples.

Example 1

The protective element 100 of the Example 1 illustrated in FIG. 1 is manufactured by the method shown below.

A fuse element having a resistance value of 0.5 mΩ and having the dimensions and materials shown below was prepared as the fuse element 2.

Width (distance 21D, 22D in Y direction) of the fuse element 2: 6.5 mm Width of the blowout portion 23 (distance 23D in the Y direction):
approximately 5.4 mm Thickness of the blowout portion 23 (distance H23 in the Z direction): 0.2 mm Material: A laminated body wherein an outer layer, an inner layer, and an outer layer are laminated in this order in the thickness direction by covering the entire surfaces of both surfaces of the inner layer, which is composed of an alloy having Sn as a main component, with an outer layer, which is composed of an Ag plating layer having a minimum thickness of 10 μm.

The first terminal 61 and the second terminal 62 were prepared made of Cu.

Then, the first terminal 61 was soldered on the first end portion 21 of the fuse element 2, and the second terminal 62 was soldered on the second end portion 22, and these were integrated. The length 2L in the X direction excluding the area overlapping with the first terminal 61 and the second terminal 62 in a plan view of the fuse element 2 was made to be 9.5 mm.

A case where an external shape in a state where the first case 6*a* and the second case 6*b* are joined is a rectangular cuboid shape of 16.8 mm long (length in the X direction), 18.0 mm width (length in the Y direction), and 10 mm in height (length in the Z direction) was prepared as the case 6. Nylon 66 (product name; N66 (NC), manufactured by Toray Industries, Inc.) was used as the material of the case 6.

By setting the depth of the first concave portion 68*d* of the first case 6*a* to be 1.0 mm and the height of the second convex portion 68*b* of the second case 6*b* to be 0.25 mm, the distance H6 in the Z direction between the first wall surface 60*c* and the second wall surface 60*d* in the housing portion 60 was made to be 0.75 mm.

Moreover, a distance 60D in the width direction (Y direction) of the blowout portion 23 between the third wall surface 60*g* and the fourth wall surface 60*h* in the housing portion 60 was made to be 14 mm, and a length 6L in the X direction between the fifth wall surface 60*e* and the sixth wall surface 60*f* in the housing portion 60 was made to be 8.0 mm.

Next, a member where the fuse element 2, and the first terminal 61 and the second terminal 62 are integrated was installed on the second case 6*b*.

Then, this was disposed so that the center position of the length 2L in the X direction excluding the region overlapping with the first terminal 61 and the second terminal 62 of the fuse element 2 in the plan view and the center position of the length 6L in the X direction between the fifth wall surface 60*e* and the sixth wall surface 60*f* match, and so that the center position of the length between the third wall surface 60*g* and the fourth wall surface 60*h* and the center position in the Y direction of the fuse element 2 match.

Thereafter, the first case 6*a* was installed on a member in which the fuse element 2, the first terminal 61, and the second terminal 62 are integrated, and the first case 6*a* and the second case 6*b* were joined by a method in which an adhesive tape composed of polyimide is wound around the outer surfaces of the first case 6*a* and the second case 6*b*.

The protective element of Example 1 was obtained through the above process.

Example 2

The protective element of Example 2 was obtained in the same way as Example 1, except that by setting the depth of the first concave portion 68*d* of the first case 6*a* to be 0.5 mm and the height of the second convex portion 68*b* of the second case 6*b* to be 0.25 mm, the distance H6 in the Z direction between the first wall surface 60*c* and the second wall surface 60*d* was made to be 0.25 mm (1.25 times the thickness of the blowout portion (0.2 mm)).

Example 3

The protective element of Example 3 was obtained in the same way as Example 1, except that by setting the depth of the first concave portion 68*d* of the first case 6*a* to be 2.0 mm and the height of the second convex portion 68*b* of the second case 6*b* to be 0.25 mm, the distance H6 in the Z direction between the first wall surface 60*c* and the second wall surface 60*d* was made to be 1.75 mm (8.75 times the thickness of the blowout portion (0.2 mm)).

Example 4

The protective element of Example 4 was obtained in the same way as Example 1, except that by setting the depth of the first concave portion 68*d* of the first case 6*a* to be 1.0 mm and using the second case 6*b* provided with the second concave portion 68*e* of depth 0.5 mm instead of the second convex portion 68*b*, the distance H6 in the Z direction between the first wall surface 60*c* and the second wall surface 60*d* was made to be 1.5 mm (7.5 times the thickness of the blowout portion (0.2 mm)).

Example 5

The protective element of Example 5 was obtained in the same way as Example 1, except that by setting the depth of the first concave portion 68*d* of the first case 6*a* to be 1.0 mm and using the second case 6*b* provided with the second concave portion 68*e* of depth 1.0 mm instead of the second convex portion 68*b*, the distance H6 in the Z direction between the first wall surface 60*c* and the second wall surface 60*d* was made to be 2.0 mm (10 times the thickness of the blowout portion (0.2 mm)).

Comparative Example 1

The protective element of Comparative Example 1 was obtained in the same way as Example 1, except that by setting the depth of the first concave portion 68*d* of the first case 6*a* to be 2.0 mm and using the second case 6*b* provided with the second concave portion 68*e* of depth 2.0 mm instead of the second convex portion 68*b*, the distance H6 in the Z direction between the first wall surface 60*c* and the second wall surface 60*d* was made to be 4.0 mm (20 times the thickness of the blowout portion (0.2 mm)).

The protective elements of Example 1 to Example 5 and Comparative Example 1 obtained in this manner were installed in current paths with voltages of 150 V and currents of 2000 A, and current cutoffs were performed. Then, the protective elements of Example 1 to Example 5 and Comparative Example 1 were measured and evaluated according to the items shown below.

Figure 13:
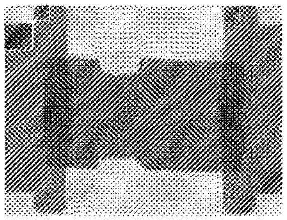
FIG. 13 is a drawing showing measurement results of the protective element of Examples 1 to 3 and evaluation results of when the protective element is cut off at a voltage of 150 V and a current of 2000 A.
Figure 13:
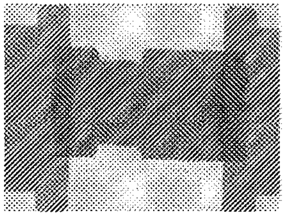
Figure 13:
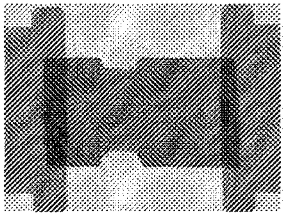
Figure 13:
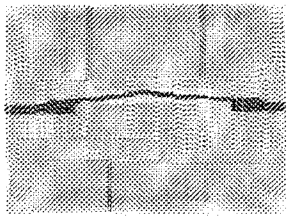
Figure 13:
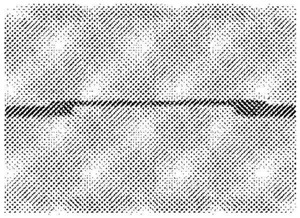
Figure 13:
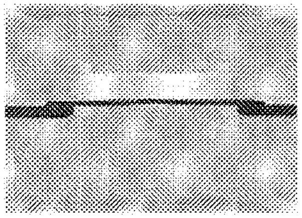
Figure 13:
Figure 13:
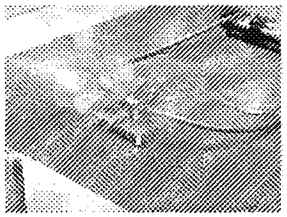
Figure 13:
Figure 13:
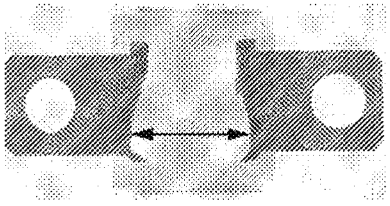
Figure 13:
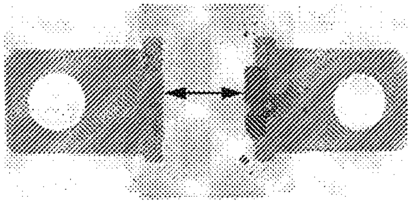
Figure 13:
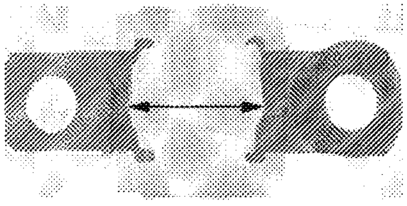
Figure 14:
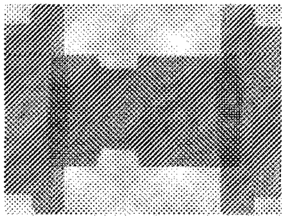
FIG. 14 is a drawing showing measurement results of the protective element of Example 4, Example 5, and Comparative Example 1 and evaluation results of when the protective element is cut off at a voltage of 150 V and a current of 2000 A.
Figure 14:
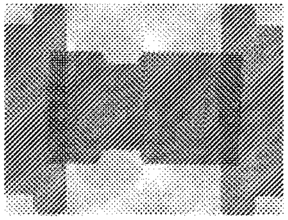
Figure 14:
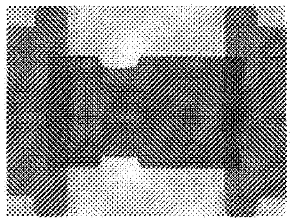
Figure 14:
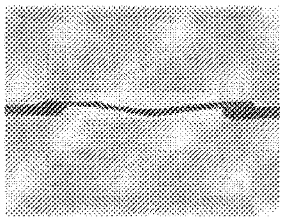
Figure 14:
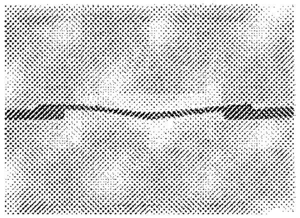
Figure 14:
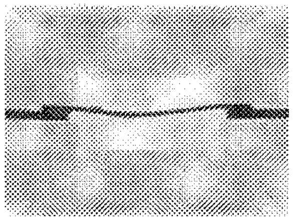
Figure 14:
Figure 14:
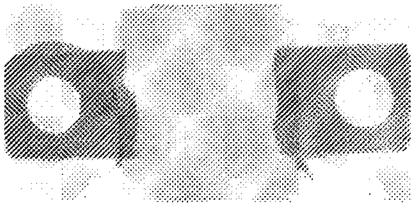
Figure 14:
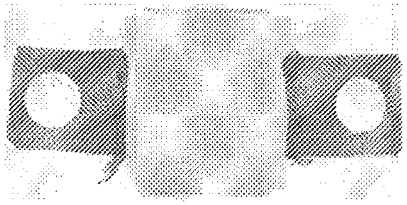
Figure 14:
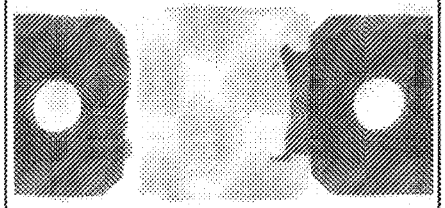
Figure 15:
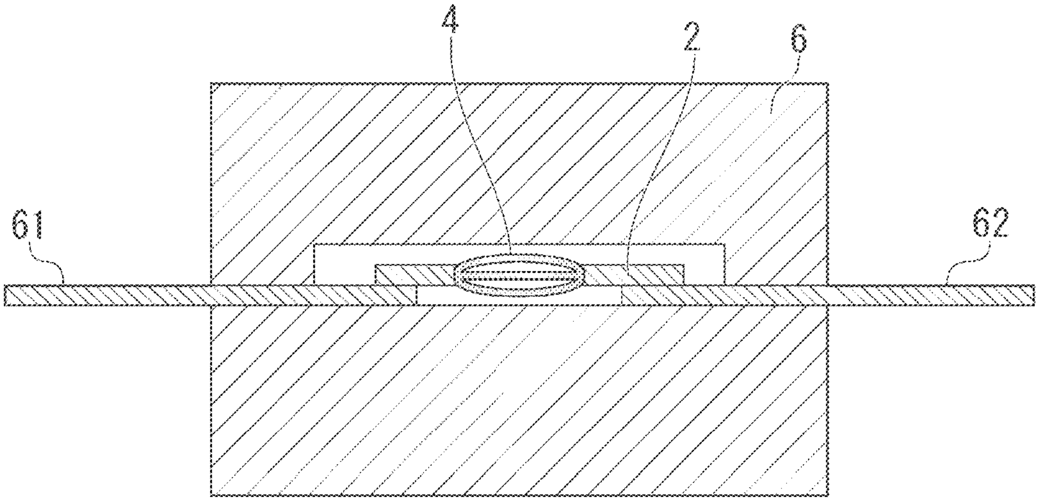
FIG. 15 is a drawing for describing the density of lines of electric force of a blowout portion of the fuse element in the protective element A.
Figure 16:
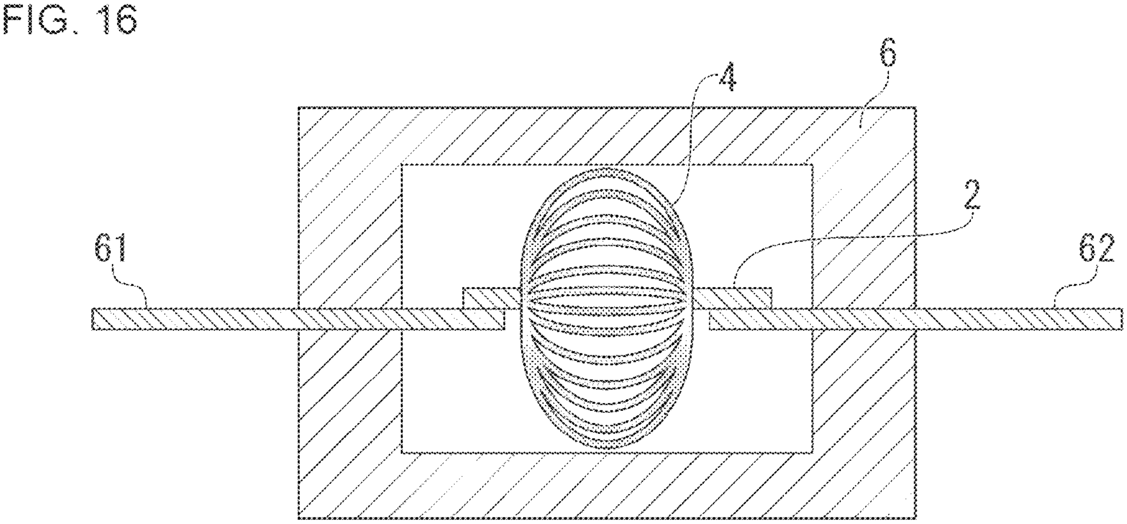
FIG. 16 is a drawing for describing the density of lines of electric force of a blowout portion of the fuse element in the protective element B.

FIG. 13 is a drawing showing measurement results of the protective elements of Example 1 to Example 3 and evaluation results of when the protective elements were cut off at a voltage of 150 V and a current of 2000 A. FIG. 14 is a drawing showing measurement results of the protective elements of Example 4, Example 5, and Comparative Example 1 and evaluation results of when the protective elements were cut off at a voltage 150 V and a current 2000 A.

(Space Height)

The distance H6 in the Z direction between the first wall surface 60*c* and the second wall surface 60*d* in the housing portion 60 was calculated from the depth dimension of the first concave portion 68*d* of the first case 6*a* and the height dimension of the second convex portion 68*b* or the depth dimension of the second concave portion 68*e* in the second case 6*b* and made to be a space height.

(Cutoff Time)

Using a current probe capable of measuring a current of 2000 A or more, the time from the start of conduction to the cutoff of the current was measured.

(Fusing Length)

The length, which have fused at the time of current cutoff, in the X direction of a member in which the fuse element 2, the first terminal 61, and the second terminal 62 are integrated, was measured and made to be a fusing length.

The arrows shown on the X-ray top surface after testing indicate the fusing length. In the protective elements of Example 1, Example 3 to Example 5, and Comparative Example 1, not only the fuse element 2, but also the first terminal 61 and the second terminal 62 fused at the time of current cutoff.

(X-Ray Top Surface Before Test)

X-ray photographs where the protective elements of Example 1 to Example 5 and Comparative Example 1 prior to supplying current were photographed from the first case 6*a* side using an X-ray photography device.

(X-Ray Side Surface Before Test)

X-ray photographs where the protective elements of Example 1 to Example 5 and Comparative Example 1 prior to supplying current were photographed seen from the Y direction using the above X-ray photography device. The light gray part in the photograph is the space. The dark gray part is the case. The black part which crosses the center part of the photograph is the member where the fuse element 2, and the first terminal 61 and the second terminal 62 were integrated.

(X-Ray Top Surface After Test)

X-ray photographs where the protective elements of Example 1 to Example 5 and Comparative Example 1 after supplying cutoff current were photographed from the first case 6*a* side using the above X-ray photography device.

(At the Time of Cutoff)

Photographs of the appearance of the arc discharge of the protective elements of Example 1 to Example 4. For the protective elements of Example 5 and Comparative Example 1, the captured images were pure white due to light caused by arc discharge.

(Judgment)

Evaluation was based on the following criteria.

A: Only the fuse element was fused.

B: In addition to the fuse element, fusing of the first terminal and the second terminal can be seen, but a portion of the flange portions of the first terminal and the second terminal remains unfused.

C: In addition to the fuse element, fusing of flange portions of the first terminal and the second terminal can be seen, but portions of the first terminal and the second terminal remain inside the case.

D: In addition to the fuse element, the first terminal and the second terminal are fused to the outside of the case.

As illustrated in the photographs of the X-ray top surface prior to testing in FIGS. 13 and 14, in the protective elements of Example 1 to Example 5 and Comparative Example 1, no difference was observed in the X-ray photographs taken from the first case 6*a* side.

As illustrated in the photographs of the X-ray side surface prior to testing in FIG. 13, in the protective elements of Example 2 and Example 3, the entire surface on the second wall surface 60*d* side in the blowout portion 23 of the fuse element 2 is disposed in contact with the second wall surface 60*d*. Furthermore, as illustrated in the photograph of the X-ray side surface prior to testing in FIG. 13, in the protective element of Example 2, the surface of the second wall surface 60*d* side of the blowout portion 23 is disposed in contact with the second wall surface 60*d*, and the surface of the first wall surface 60*c* side of the blowout portion 23 is disposed in contact with the first wall surface 60*c*.

As illustrated in FIG. 13, in the protective element of Example 2, as illustrated in the photograph of the X-ray top surface after testing, the current was cut off with only the fuse element 2 fused, and without fusing the first terminal 61 and the second terminal 62. Furthermore, in the protective elements of Example 1 to Example 3, as illustrated in the photograph taken at the time of cutoff, the arc discharge that occurred at the time of the fuse element 2 fusing was small.

Furthermore, from the results of the protective elements of Example 1 to Example 3, it was confirmed that the lower the space height, the shorter the cutoff time and cutoff length and the smaller the arc discharge.

Furthermore, as illustrated in the photographs of the X-ray side surface prior to testing in FIG. 14, in the protective elements of Example 4, Example 5, and Comparative Example 1, spaces are provided between the fuse element 2 and the first wall surface 60*c*, and between the fuse element 2 and the second wall surface 60*d*.

As illustrated in FIG. 14, in the protective elements of Example 4 and Example 5, as illustrated in the photographs of the X-ray top surface after testing, the fuse element 2 and the flange portions of the first terminal 61 and the second terminal 62 fused, but a portion of the first terminal 61 and the second terminal 62 remained inside the case without fusing.

In contrast to this, in Comparative Example 1, the fuse element 2 fused, and furthermore, the first terminal and the second terminal fused up to the outside of the case, and compared to Example 1 to Example 5, the arc discharge was large.

Furthermore, as illustrated in FIG. 14, with the protective elements of Example 4, Example 5, and Comparative Example 1 as well, similarly to the protective elements of Example 1 to Example 3, it was possible to confirm that the lower the space height, the shorter the cutoff time and the smaller the arc discharge becomes.

For the protective elements of Examples 1, 3, and 4, the length 2L in the X direction excluding the area overlapping with the first terminal 61 and the second terminal 62 in a plan view of the fuse element 2 is 9.5 mm. In the protective elements of Examples 1, 3, and 4, arc discharge was comparatively small, and therefore, it is estimated that fusing of the first terminal 61 and the second terminal 62 can be suppressed by making the above length 2L longer than 9.5 mm.

Moreover, the protective element of Example 3 (space height of 1.75 mm) is a protective element with a higher space height than the protective element of Example 4 (space height of 1.5 mm), but the result was that the cutoff time and cutoff length were shorter than those of the protective element of Example 4.

This is presumed to be because for the protective element of Example 3, arc discharge is further suppressed because the entire surface of the second wall surface 60*d* side in the blowout portion 23 of the fuse element 2 is disposed in contact with the second wall surface 60*d*.

Therefore, in the protective element of Example 5, similarly to Example 3, it is presumed that even at a space height of 2.0 mm (10 times the length in the thickness direction of the fuse element 2), arc discharge can be suppressed to a small scale by disposing the entire surface of the second wall surface 60*d* side in the blowout portion 23 of the fuse element 2 in contact with the second wall surface 60*d*.

(Protective Element A)

An element that is the same as the protective element of Example 1 except that a shielding mechanism is added to the blowout portion 23, was created as a protective element A, which is an example of the present invention.

The protective element A is provided with a slider component having an opening through which the fuse element is arranged as the shielding mechanism. The slider component is moved in the Z direction orthogonal to the energization direction of the fuse element at the time of fusing to physically close the first insertion hole.

Figure 8:
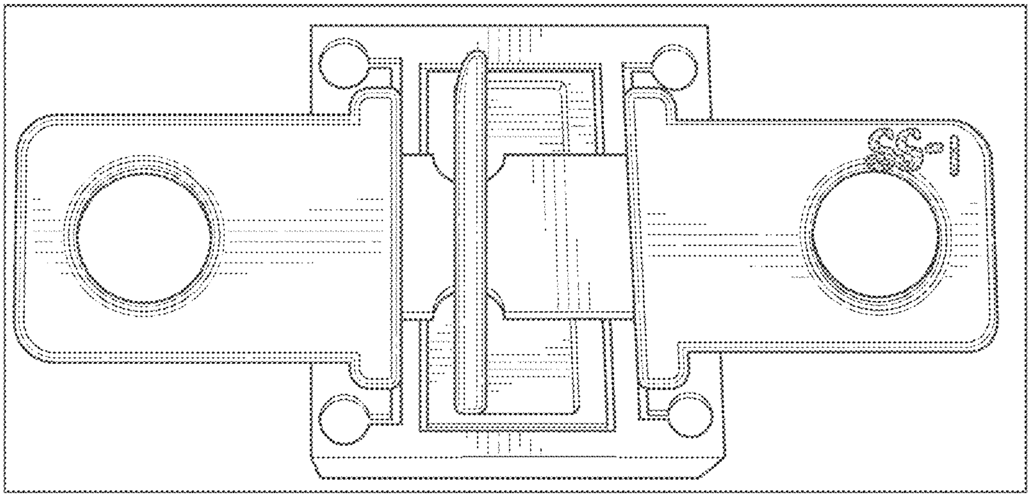
FIG. 8 is a drawing of a member where the protective element A, a first terminal, and a second terminal used in a fuse element are integrated and installed on the second case.

FIG. 8 is a photograph of a member where the fuse element used in the protective element A, the first terminal, and the second terminal are integrated and installed on the second case together with the slider component.

The fuse element is integrated with the first terminal and the second terminal in a state of being penetrated through the opening of the slider component.

(Protective Element B)

A protective element B that is a comparative example of the present invention was obtained in the same way as Example 1 except that the distance H6 in the Z direction between the first wall surface 60*c* and the second wall surface 60*d* in the housing portion 60 was 14 mm, the distance 60D in the width direction (Y direction) of the blowout portion 23 between the third wall surface 60*g* and the fourth wall surface 60*h* was 24.6 mm, and the length 6L in the X direction between the fifth wall surface and the sixth wall surface 60*f* in the housing portion 60 was 13.6 mm.

The protective element A and the protective element B obtained in this manner were installed in current paths with voltages of 150 V and currents of 190 A, and current cutoffs were performed.

Figure 9:
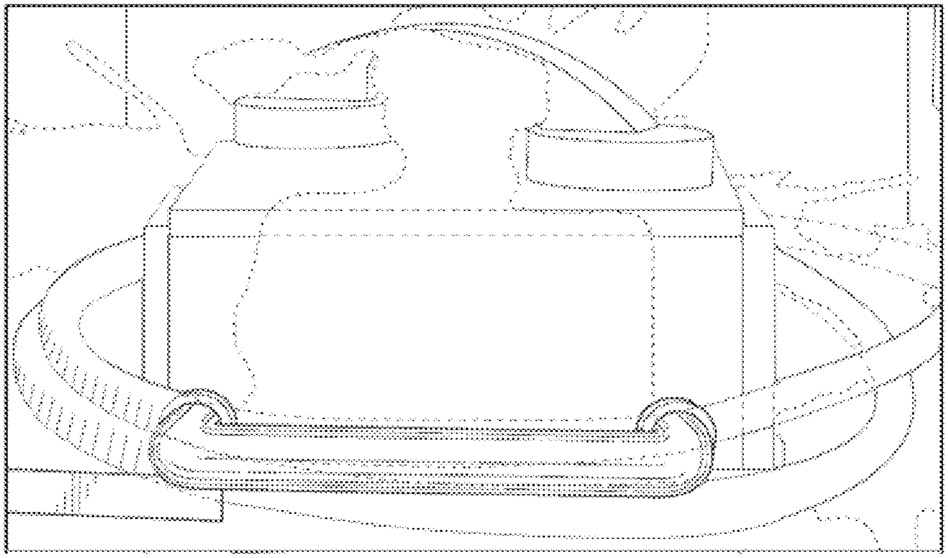
FIG. 9 is a drawing of arc discharge when the protective element B, which is a comparative example, is cut off at a voltage of 150 V and a current of 190 A.
Figure 10:
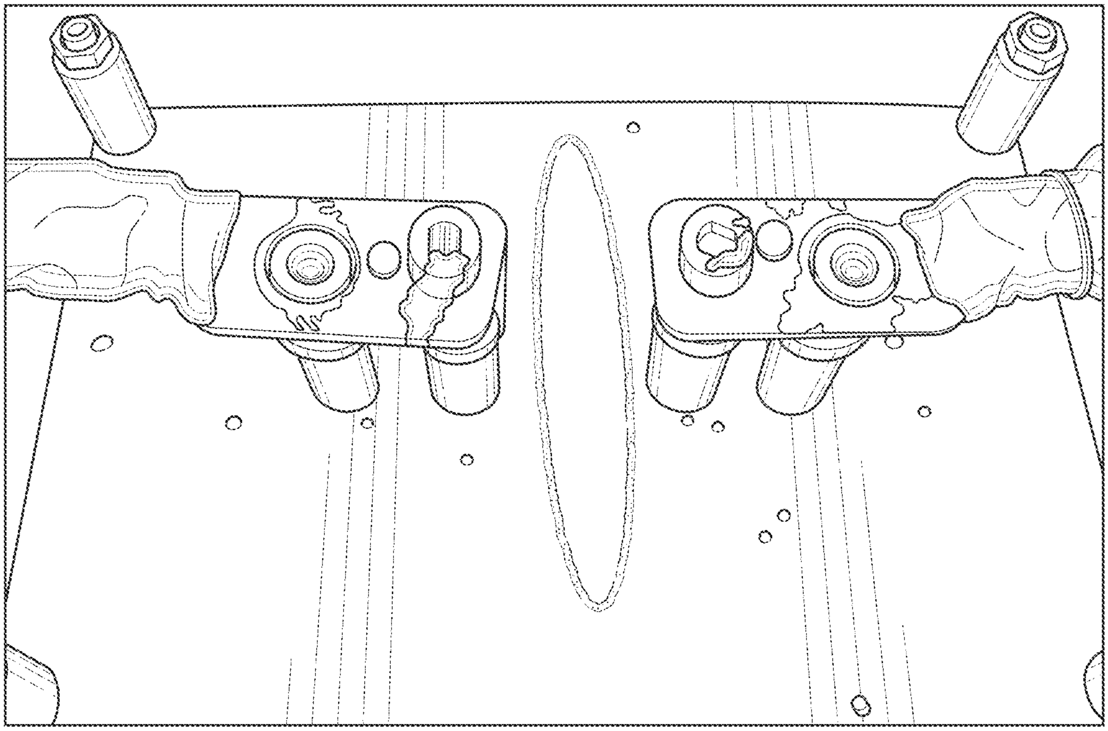
FIG. 10 is a drawing illustrating a state after current cutoff of the protective element B, which is a comparative example.

FIG. 9 is a photograph of an arc discharge when the protective element B, which is a comparative example, was cut off at a voltage of 150 V and a current of 190 A. FIG. 10 is a photograph taken of a state after current cutoff of the protective element B, which is a comparative example.

Figure 11:
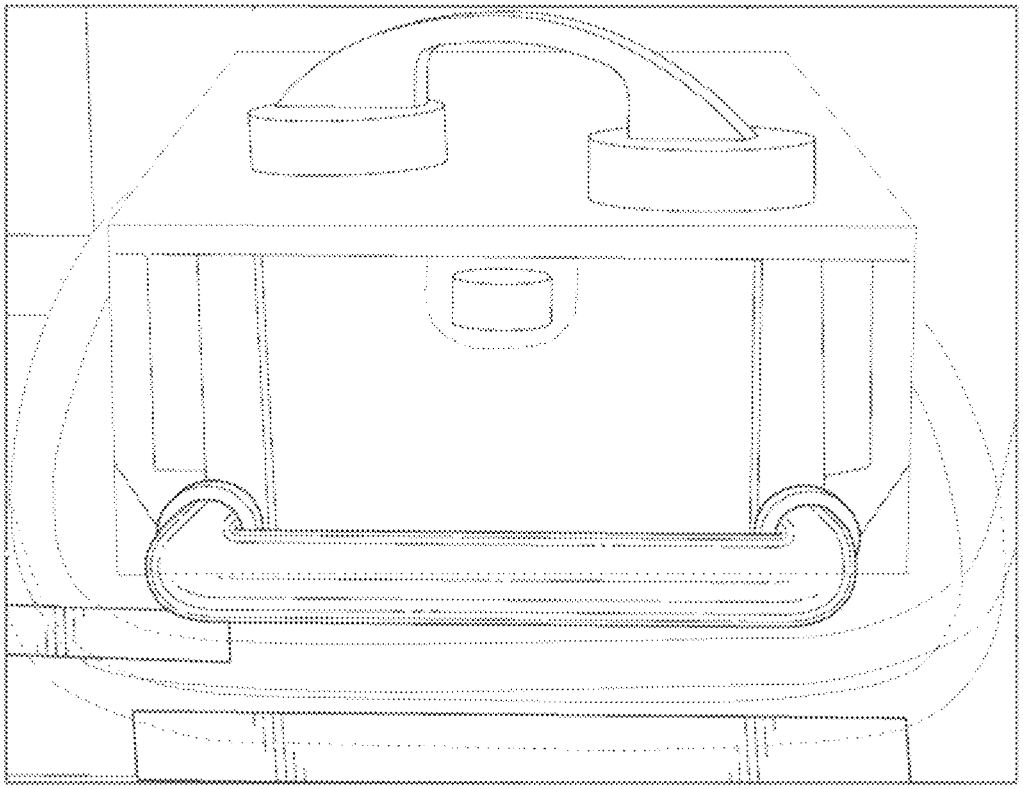
FIG. 11 is a drawing of arc discharge when the protective element A. which is an example, is cut off at a voltage of 150 V and a current of 190 A.
Figure 12:
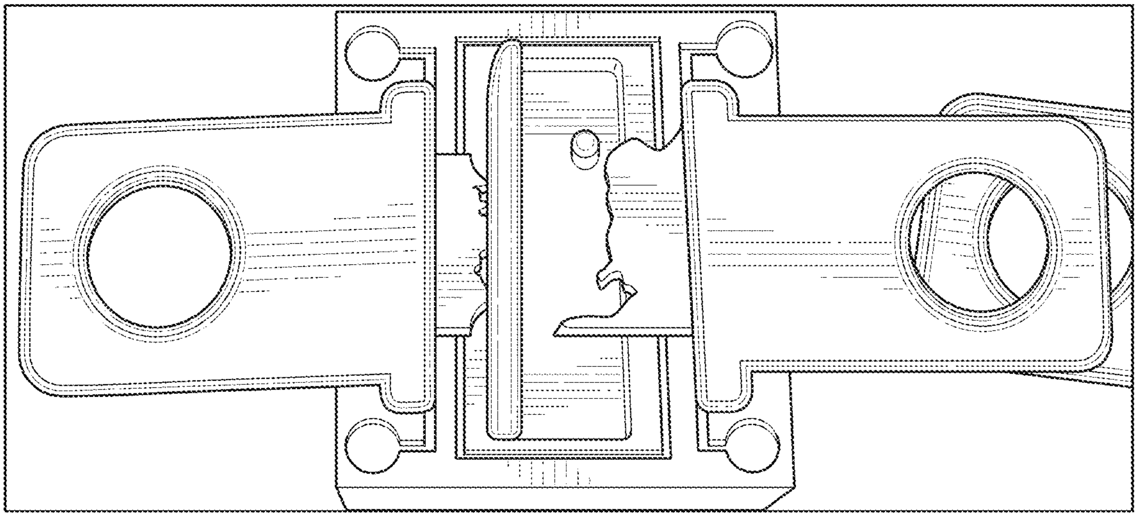
FIG. 12 is a drawing illustrating a state after current cutoff of the protective element of the protective element A, which is an example.

FIG. 11 is a photograph of an arc discharge when the protective element A, which is an example, was cut off at a voltage of 150 V and a current of 190 A. FIG. 12 is a photograph taken of a state after current cutoff of the protective element of the protective element A, which is an example.

As illustrated in FIG. 9, in the protective element B having the distance H6 in the Z direction between the first wall surface 60*c* and the second wall surface 60*d* of 14 mm (70 times the thickness of the blowout portion 23 (0.2 mm)), a large arc discharge occurred, and sparks were emitted from the protective element together with an explosive sound. Furthermore, as illustrated in FIG. 10, in the protective element B, the fuse element 2, and the first terminal 61 and the second terminal 62, respectively electrically connected to both ends of the fuse element 2, were fused.

Meanwhile, as illustrated in FIG. 11, in the protective element A having the distance H6 in the Z direction between the first wall surface 60*c* and the second wall surface 60*d* of 0.75 mm (3.75 times the thickness of the blowout portion (0.2 mm)), the arc discharge was small compared to that of the protective element B. Furthermore, as illustrated in FIG. 12, in the protective element A, the current was cut off by only a portion of the fuse element 2 fusing. Furthermore, in the protective element A, insulation resistance is excellent at $1.36\times10^{12}\ \Omega$.

DESCRIPTION OF REFERENCE NUMBERS

2 Fuse element
4 Lines of electric force
6 Case
6*a* First case
6*b* Second case
21 First end portion
22 Second end portion
23 Blowout portion
25 First coupling portion
26 Second coupling portion

60 Housing portion
60*b* Space
60*c* First wall surface
60*d* Second wall surface
60*e* Fifth wall surface
60*f* Sixth wall surface
60*g* Third wall surface
60*h* Fourth wall surface
61 First terminal
61*a*, 62*a* External terminal hole
61*c*, 62*c* Flange portion
62 Second terminal
64 First insertion hole
64*a*, 64*b*, 65*a*, 65*b* Terminal mounting surface
64*c*, 64*d*, 65*c*, 65*d* Insertion hole forming surface
65 Second insertion hole
67*c*, 67*d* Leak prevention groove
68*a* First joint surface
68*b* Second convex portion
68*c* Second joint surface
68*d* First concave portion
68*e* Second concave portion
100, 200 Protective element

The invention claimed is:

1. A protective element comprising:

a fuse element which comprises a blowout portion between a first end portion and a second end portion, and is energized in a first direction from the first end portion to the second end portion; and a case composed of an insulating material and having a housing portion therein, the housing portion being surrounded by the insulating material of the case and housing the blowout portion therein, wherein a length in a thickness direction in a cross section perpendicular to the first direction of the blowout portion is less than or equal to a length in a width direction perpendicular to the thickness direction in the cross section, a first wall surface and a second wall surface that face each other in the thickness direction are provided in the housing portion, a distance in the thickness direction between the first wall surface and the second wall surface is 10 times or less the length in the thickness direction of the blowout portion, a third wall surface and a fourth wall surface that face each other in the width direction are provided in the housing portion, a distance in the width direction between the third wall surface and the fourth wall surface is 1.5 times or more the length of the fuse element in the width direction, and the blowout portion is disposed in contact with one or both of the first wall surface and the second wall surface.

2. The protective element according to claim 1, wherein the distance in the thickness direction between the first wall surface and the second wall surface is 5 times or less the length in the thickness direction of the blowout portion.

3. The protective element according to claim 1, wherein the distance in the thickness direction between the first wall surface and the second wall surface is twice or less the length in the thickness direction of the blowout portion.

4. The protective element according to claim 1, wherein the distance in the width direction between the third wall surface and the fourth wall surface is 2 to 5 times the length of the fuse element in the width direction.

5. The protective element according to claim 1, wherein the fuse element is planar or linear.

6. The protective element according to claim 1, further comprising:

a first terminal electrically connected to the first end portion; and a second terminal electrically connected to the second end portion.

7. The protective element according to claim 1, wherein the melting temperature of the fuse element is 600° C. or less.

8. The protective element according to claim 1, wherein the melting temperature of the fuse element is 400° C. or less.

9. The protective element according to claim 1, wherein the fuse element comprises a laminated body in which an inner layer composed of a low melting point metal and an outer layer composed of a high melting point metal are laminated in the thickness direction thereof.

10. The protective element according to claim 9, wherein the low melting point metal is composed of Sn or a metal comprising Sn as a main component thereof, and wherein the high melting point metal is composed of Ag or Cu or a metal comprising Ag or Cu as a main component thereof.

11. The protective element according to claim 1, wherein the case is formed of a resin material having a tracking resistance index CTI of 400 V or more.

12. The protective element according to claim 1, wherein the case is formed of a resin material having a tracking resistance index CTI of 600 V or more.

13. The protective element according to claim 1, wherein the case comprises a nylon resin, a fluorine resin, a polyphthalamide resin, or combinations thereof.

14. The protective element according to claim 13, wherein the nylon resin does not comprise a benzene ring.

15. The protective element according to claim 1, wherein the blowout portion is disposed in contact with both of the first wall surface and the second wall surface.

* * * * *